(12) United States Patent
Harada

(10) Patent No.: US 7,526,627 B2
(45) Date of Patent: Apr. 28, 2009

(54) STORAGE SYSTEM AND STORAGE SYSTEM CONSTRUCTION CONTROL METHOD

(75) Inventor: Akitatsu Harada, Tama (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 11/028,537

(22) Filed: Jan. 5, 2005

(65) Prior Publication Data

US 2006/0101221 A1 May 11, 2006

(30) Foreign Application Priority Data

Nov. 5, 2004 (JP) ............................. 2004-321610

(51) Int. Cl.
*G06F 12/00* (2006.01)
*G06F 12/08* (2006.01)
(52) U.S. Cl. ...................... 711/202; 711/203; 711/205; 711/206; 711/207; 711/170; 711/4
(58) Field of Classification Search ........................ None
See application file for complete search history.

(56) References Cited

U.S. PATENT DOCUMENTS

2001/0054093 A1  12/2001  Iwatani

2007/0043925 A1 * 2/2007 Serizawa et al. ............ 711/170

* cited by examiner

*Primary Examiner*—Sanjiv Shah
*Assistant Examiner*—Midys Rojas
(74) *Attorney, Agent, or Firm*—Antonelli, Terry, Stout & Kraus, LLP.

(57) ABSTRACT

In the present invention, memory resources are effectively utilized by virtualizing external memory resources as internal memory resources, and erroneous operations that destroy the cooperative relationship of these memory resource and the like are prevented in advance. An external storage 2 is connected to a main storage 1, and real volumes 2A1 and 2A2 are respectively mapped into virtual volumes 1B1 and 1B2 (S1). The control server 3 respectively acquires construction information 1D and 2D for the respective storages 1 and 2, and stores and controls this construction information in a storage part 3D (S2). When the user inputs operation contents 4A from a control terminal 4 (S3), the control server 3 judges whether or not the operation contents 4A have an effect on the cooperation between the storages 1 and 2 on the basis of the operation contents 4A and the information in the storage part 3D (S4), and performs only operations that do not have an effect (S5).

19 Claims, 25 Drawing Sheets

FIG. 5

T1 — EXTERNAL DEVICE INFORMATION

| VDEV | DEVICE DISCRIMINATING INFORMATION | CAPACITY (KB) | DEVICE TYPE | PATH INFORMATION | |
|---|---|---|---|---|---|
| | | | | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |
| 3 | AABBCCDDEE | 5,544,223 | DISK | 0x77DE12345 | 6 |
| | | | | 0x77DE12345 | 3 |
| | | | | 0x377DE7890 | 5 |

ALTERNATE PATH (last two rows)

FIG. 7

ACCESS ATTRIBUTE CONTROL TABLE (T4)

| LUN NUMBER | ACCESS ATTRIBUTE |
|---|---|
| LU#1 | READ/WRITE POSSIBLE |
| LU#2 | READ ONLY (WRITE PROHIBITED) |
| LU#3 | READ/WRITE IMPOSSIBLE |
| LU#4 | EMPTY CAPACITY 0 |
| LU#5 | COPYING DESTINATION SETTING IMPOSSIBLE |
| LU#6 | HIDDEN |
| ..... | ..... |

FIG. 11

MAPPING TABLE

| STORAGE ID | VDEV NUMBER | DEVICE ID | CAPACITY (KB) | DEVICE TYPE | PATH INFORMATION | | | ALTERNATE PATHS | | |
|---|---|---|---|---|---|---|---|---|---|---|
| | | | | | PORT NUMBER | WWN | LUN | | | |
| Rm001 | 0 | Re001 | 1,024,000 | Disk | 0A | 0xAABC0 | 0 | | | |
| Rm001 | 1 | Re001 | 65,536 | Disk | 0A | 0xAABC0 | 1 | | | |
| Rm001 | 2 | Re001 | 256,000 | Disk | 0B | 0xAABC1 | 0 | | | |
| Rm002 | 0 | Re002 | 512,000 | Disk | 1C | 0xBBCD0 | 1 | | | |
| Rm002 | 1 | Re003 | 2,048,000 | Disk | 1D | 0xCCDE0 | 2 | | | |
| | | | | | 1E | 0xCCDE1 | 4 | | | |
| | | | | | 1F | 0xCCDE2 | 0 | | | |
| ... | ... | ... | ... | ... | ... | ... | ... | | | |

FIG. 12

T10: VDEV-LDEV-LUN-HOST (INTERNAL VOLUME) CONTROL TABLE

| STORAGE ID | VDEV NUMBER | LDEV NUMBER | CAPACITY (KB) | VOLUME ATTRIBUTES | | PATH INFORMATION (TO HOST) | | | |
|---|---|---|---|---|---|---|---|---|---|
| | | | | EMULATION TYPE | PAIR STATE | PORT NUMBER | HOST GROUP NUMBER | WWN | LUN |
| Rm001 | 0 | 1 | 512,000 | TYPE 1 | NORMAL | 1A | 0 | 0x00ABCD0 | 0 |
| Rm001 | 0 | 2 | 512,000 | TYPE 1 | NORMAL | 1B | 1 | 0x00ABCD1 | 0 |
| Rm001 | 1 | 3 | 65,536 | TYPE 2 | PAIR | 2A | 0 | 0x00BCDE0 | 1 |
| Rm001 | 2 | 4 | 256,000 | TYPE 3 | NORMAL | 3D | 2 | 0x00CDEF1 | 0 |
| Rm002 | 0 | 10 | 512,000 | TYPE 0 | PAIR | 2A | 1 | 0x00DEFG0 | 0 |
| Rm002 | 1 | 11 | 1,024,000 | TYPE 1 | NORMAL | 2A | 1 | 0x00EFGH0 | 1 |
| Rm002 | 1 | 12 | 1,024,000 | TYPE 1 | NORMAL | 2B | 10 | 0x00FGHI0 | 10 |
| ... | ... | ... | ... | ... | ... | ... | ... | ... | ... |

FIG. 13

EXTERNAL VOLUME CONTROL TABLE  T11

| STORAGE ID | ARRAY GROUP | | LDEV NUMBER | CAPACITY (KB) | VOLUME ATTRIBUTES | | PATH INFORMATION (TO HOST) | | | |
|---|---|---|---|---|---|---|---|---|---|---|
| | GROUP NUMBER | RAID TYPE | | | EMULATION TYPE | PAIR STATE | PORT NUMBER | HOST GROUP NUMBER | WWN | LUN |
| Re001 | 0 | RAID5 | 1 | 1,024,000 | TYPE A | NORMAL | 1C | 1 | 0x00AAA0A | 0 |
| Re001 | 1 | RAID1+0 | 2 | 65,536 | TYPE B | NORMAL | 1C | 1 | 0x00AAA0A | 1 |
| Re001 | 2 | RAID5 | 3 | 256,000 | TYPE 1 | NORMAL | 1D | 0 | 0x00AAA0B | 0 |
| Re002 | 1 | RAID1 | 10 | 512,000 | TYPE 3 | PAIR | 1E | 1 | 0xFF00EIC | 1 |
| Re003 | 0 | RAID5 | 20 | 2,048,000 | | NORMAL | 0A | 10 | 0xFF00EID | 2 |
| | | | | | TYPE 5 | NORMAL | 0B | 0 | 0xFF00EIE | 4 |
| | | | | | | NORMAL | 0C | 1 | 0xFF00EIF | 0 |
| ... | ... | ... | ... | ... | ... | ... | ... | ... | ... | ... |

STORAGE SYSTEM AND STORAGE SYSTEM CONSTRUCTION CONTROL METHOD

CROSS-REFERENCE TO RELATED APPLICATIONS

This application relates to and claims priority from Japanese Patent Application No. 2004-321610 filed on Nov. 5, 2004, the entire disclosure of which is incorporated herein by reference.

BACKGROUND OF THE INVENTION

1. Field of the Invention

The present invention relates to a storage system and a storage system construction control method.

2. Description of the Related Art For example, data is controlled using relatively large-scale storage systems in order to handle large quantities of various types of data in government organizations, public offices, autonomous regional bodies, business enterprises, educational organizations and the like. For instance, such storage systems are constructed from disk array devices or the like. Disk array devices are constructed by disposing numerous storage devices in the form of an array; for example, a storage region based on an RAID (redundant array of independent disks) is provided. One or more logical volumes (logical units) are formed in a physical storage region provided by a storage device group, and these logical volumes are provided to a host computer (more specifically, to a data base program operating in a host computer). The host computer (hereafter abbreviated to "host") can perform the reading and writing of data with respect to the logical volumes by transmitting specified commands.

With the development of an informationized society and the like, there has been a continual increase in the amount of data that must be managed. Consequently, there is a demand for storage control devices that offer higher performance and a larger capacity, and there have been cases in which storage systems using a plurality of storage control devices have been constructed in order to meet this market demand. Such storage systems using a plurality of storage control devices include systems in which a comprehensive control mechanism is provided, and the system is devised so that the access to respective storage control devices by respective hosts can be set and controlled in a unified manner (Japanese Patent Application Laid-Open No. 2002-63063).

The storage system described in the abovementioned patent is merely a storage system in which the setting of access paths or the like is controlled in a unified manner so that a comprehensive security system is established; no consideration is given to organic cooperation between the respective storage control devices.

Specifically, in this patent reference, no consideration is given to the effective utilization of the memory resources of the storage system as a whole by causing a plurality of storage control devices to cooperate, and allowing one storage control device to utilize the memory resources of another storage control device as the owner of these resources.

SUMMARY OF THE INVENTION

It is one object of the present invention to provide a storage system and storage system construction control method which are devised so that memory resources can be effectively utilized by causing a plurality of storage control device to cooperate, and so that alterations in the construction of the storage system can be made while maintaining the mutual coexistence relationship between these respective storage control devices. Another object of the present invention is to provide a storage system and a storage system construction alteration method which are devised so that a plurality of storage control device are caused to cooperate, the mutual coexistence relationship between these respective storage control devices can be grasped with good efficiency, and alterations in the construction can be stably made while maintaining this mutual coexistence relationship. Still other objects of the present invention will become clear from the following description of embodiments.

In order to solve the abovementioned problems, the storage system of the present invention comprises a first storage control device that can set virtual volumes, a second storage control device that is communicably connected with this first storage control device, and that can set real volumes, and a managing device that can respectively control alterations in the construction of the first storage control device and second storage control device. This managing device controls whether or not construction altering operations requested for the first storage control device or second storage control device can be performed, so that the cooperative relationship between the virtual volumes and real volumes is maintained.

Here, for example, the first storage control device can be constructed as a disk array subsystem or the like. However, the present invention is not limited to this; for example, the first storage control device can also be constructed as an intelligent fiber channel switch or the like. Furthermore, the first storage control device need not have physical volumes that actually accommodate data; this device may also constitute virtual volumes which are volumes in virtual terms.

The managing device can respectively execute (1) volume mapping processing which is used to associate real volumes set in the second storage control device with virtual volumes set in the first storage control device, and thus connect real volumes as data storage destinations for virtual volumes, and (2) prohibition processing which is used to prohibit construction altering operations that have an effect on inter-volume connection constructions between the virtual volumes and real volumes that are produced by volume mapping processing.

Virtual volumes and real volumes can be associated by associating real volumes of the second storage control device with an intermediate storage stratum that is disposed between the logical storage stratum and physical storage stratum in the first storage control device.

Here, examples of construction altering operations that have an effect on inter-volume connection constructions include operations that destroy inter-volume connection constructions. For example, operations that destroy inter-volume connection constructions include operations that cancel inter-volume connection constructions, unifying operations that unify real volumes associated with virtual volumes with other real volumes of the second storage control device and the like. These prohibited inter-volume connection construction canceling operations refer to canceling operations that are performed on the side of the second storage control device; as a result, canceling operations that are erroneously performed by the user, inadvertent canceling operations and the like can be prevented in advance. In cases where an operation that cancels an inter-volume connection is performed in the first storage control device, this is permitted.

Operations that can generate mismatching in the storage contents of real volumes may also be cited as examples of construction altering operations that have an effect on inter-volume connection constructions. For example, operations that can generate mismatching in the storage contents of real volumes include operations that assign real volumes to communications ports other than the communications ports used in inter-volume connection constructions, operations that set copying pairs for real volumes and the like.

In regard to prohibition processing, construction altering operations that have an effect on inter-volume connection constructions may be prohibited only in cases where inter-volume connection constructions are maintained; this prohibition may also be stopped in cases where inter-volume connection constructions are cancelled. Specifically, construction altering operations that have an effect on inter-volume connection constructions are prevented in advance until an inter-volume connection construction is cancelled on the side of the first storage control device; then, when a canceling operation is performed on the side of the first storage control device, the prohibition of construction altering operations for the second storage control device is subsequently stopped.

The managing device can be constructed so that this managing device comprises a construction control part which acquires information relating to the respective constructions from the first storage control device and second storage control device, and stores and controls this information in a construction information storage part, a judgment part which judges whether or not a requests construction altering operation is an operation that has an effect on inter-volume connection constructions on the basis of the requested construction altering operation and the information controlled by the construction control part, and a construction setting part which performs the requested construction altering operation in cases where the judgment results obtained by the judgment part are affirmative.

Here, in cases where a construction altering operation is performed by the construction setting part, the construction control part can cause the contents of this performed construction altering operation to be reflected in information stored in a construction information storage part. As a result, the most recent construction information can be grasped without newly acquiring information relating to the respective constructions from the respective storage control devices. In other words, the construction states of the respective storage control devices can be grasped relatively easily by causing the contents of subsequently performed construction altering operations to be reflected in the acquired construction information using the initially acquired construction information as a reference.

The construction control part can also acquire information relating to the respective constructions of the first storage control device and second storage control device from the first storage control device and second storage control device in cases where the execution of discovery processing is instructed. Here, the term "discovery processing" refers to a series of procedures used to discover and recognize elements that constitute the storage system. In cases where discovery processing is performed, the mutual dependence relationships (inter-volume connection constructions) between respective storage control devices can be grasped relatively efficiently by acquiring information relating to the respective constructions of the storage control devices from the respective storage control devices together.

The construction control part can also acquired information relating to the respective constructions of the first storage control device and second storage control device from the first storage control device and second storage control device in cases where the execution of discovery processing is instructed, and there is a request for indication. Specifically, in cases where information relating to the respective constructions of the storage control devices is always acquired from the respective storage control devices in connection with the execution of discovery processing, time is required for the completion of the discovery processing, so that the convenience may adversely affected. Accordingly, information relating to the constructions of the respective storage control devices is acquired together with discovery processing only in cases where there is a request for the indication of such information by the user.

The managing device can be constructed separately from the first storage control device and second storage control device, and can be communicably connected to the first storage control device and second storage control device, respectively. Specifically, the managing device can be constructed as an independent computer machine that is separate from the respective storage control devices.

The managing device can also be installed inside the first storage control device. Specifically, the function of the managing device can be installed inside the first storage control device by utilizing the hardware resources (CPU, memory and the like) and software resources (device drivers, OS (operating system) and the like) of the first storage control device. In this case, the managing device can be constructed as a computer program, as in the case of control software or the like.

The managing device can also be constructed so as to include a first managing device that alters the construction of the first storage control device, and a second managing device which is communicably connected to this first managing device, and which alters the construction of the second storage control device. Furthermore, the first managing device can acquire and control information relating to the respective constructions of the first storage control device and second storage control device from the first storage control device and second storage control device, and when a construction altering operation of the second storage control device is requested, the second managing device can inquire for information controlled by the first managing device; then, in cases where the requested construction altering operation is not an operation that has an effect on inter-volume connection constructions, the requested construction alteration can be performed.

Specifically, respective dedicated managing devices can be installed in the respective storage control devices, and construction alterations of the first storage control device can be instructed from the first managing device, while construction alterations of the second storage control device can be instructed from the second managing device. Furthermore, in cases where construction alterations of the second storage control device are performed, the second managing device sends an inquiry for information relating to the constructions of the respective storage control devices to the first managing device. The first managing device respectively acquires and controls information relating to the constructions of the respective storage control devices, and responds to inquiries from the second managing device. On the basis of the inquiry results from the first managing device, the second managing device performs the requested construction altering operation in cases where this construction altering operation does not have an effect on inter-volume connection constructions.

The storage system construction control method according to another aspect of the present invention is a method for controlling the construction of a storage system in which a first storage control device and a second storage control device are communicably connected, comprising a connection step in which a virtual volume disposed inside a first storage control device and a real volume disposed inside a second storage control device are associated so that the real volume is connected as a data storage destination for the virtual volume, a reception step in which a construction altering operation for the first storage control device or second storage control device is received, a judgment step in which a judgment is made as to whether or not the received construction altering operation is an operation that has an effect on inter-volume connection constructions generated by the connection step, an execution step in which the construction altering operation is performed in cases where it is judged that the construction altering operation is an operation that does not have an effect on the inter-volume connection constructions, and a step in which the construction altering operation is prohibited in cases where it is judged that the construction altering operation is an operation that has an effect on the inter-volume connection constructions.

Furthermore, this method may further include a construction information control step in which information relating to the respective constructions of the first storage control device and second storage control device is acquired from the first storage control device and second storage control device and stored in a construction information storage part, and the judgment step may judge whether or not the construction altering operation is an operation that has an effect on the inter-volume connection constructions on the basis of the information that is stored in this construction information storage part.

Furthermore, this method may further include a discovery step in which discoveries relating to the first storage control device are performed, and the construction information control step may acquire information relating to the respective constructions of the first storage control device and second storage control device from the first storage control device and second storage control device and store this information in the construction information storage part when discoveries are performed by the discovery step.

Furthermore, the construction information controls step may also update the information stored in the construction information storage part on the basis of the contents of the performed construction altering operation in cases where a construction altering operation is performed by the execution step.

The storage system according to still another aspect of the present invention is a storage system in which a first storage control device and second storage control device are communicably connected, and in which a managing device that can respectively communicate with the abovementioned first storage control device and the abovementioned second storage control device is provided, wherein the first storage control device comprises a virtual intermediate storage device that is disposed in a storage region of a storage device of the second storage control device, a virtual volume that is disposed in a storage region of this virtual intermediate storage device, a communications control part that performs respective data communications between the second storage control device and the managing device, a memory part that is used by the communications control part, and a mapping table that is stored in the memory part, and that is used to map storage devices in the virtual intermediate storage device. Furthermore, the managing device may comprise a construction control part which acquires information relating to the respective constructions of the first storage control device and second storage control device from the first storage control device and second storage control device, and which stores and controls this acquired information in the construction information storage part, a judgment part which judges whether or not the requested construction altering operation is an operation that has an effect on the mapped construction on the basis of the requested construction altering operation and the information controlled by the construction control part, and a construction setting part which performs the requested construction altering operation in cases where the judgment results obtained by the judgment part are affirmative.

There are cases in which all or part of the means, functions and steps of the present invention can be constructed as computer programs that are executed by a computer system. In case where all or part of the construction of the present invention is constructed from a computer program, for example, this computer program can be fixed on various types of storage media and distributed (or the like), or can be transmitted via a communications network.

BRIEF DESCRIPTION OF THE DRAWINGS

FIG. 5 is an explanatory diagram which shows an example of the construction of the mapping table;

FIG. 7 is an explanatory diagram which shows an example of the construction of the access attribute control table;

FIG. 11 is an explanatory diagram showing the construction of the mapping table constituting a portion of the reserve information control table;

FIG. 12 is an explanatory diagram showing the construction of the internal volume control table constituting a portion of the reserve information control table;

FIG. 13 is an explanatory diagram showing the construction of the external volume control table constituting a portion of the reserve information control table;

DESCRIPTION OF THE PREFERRED EMBODIMENTS

Figure 1:
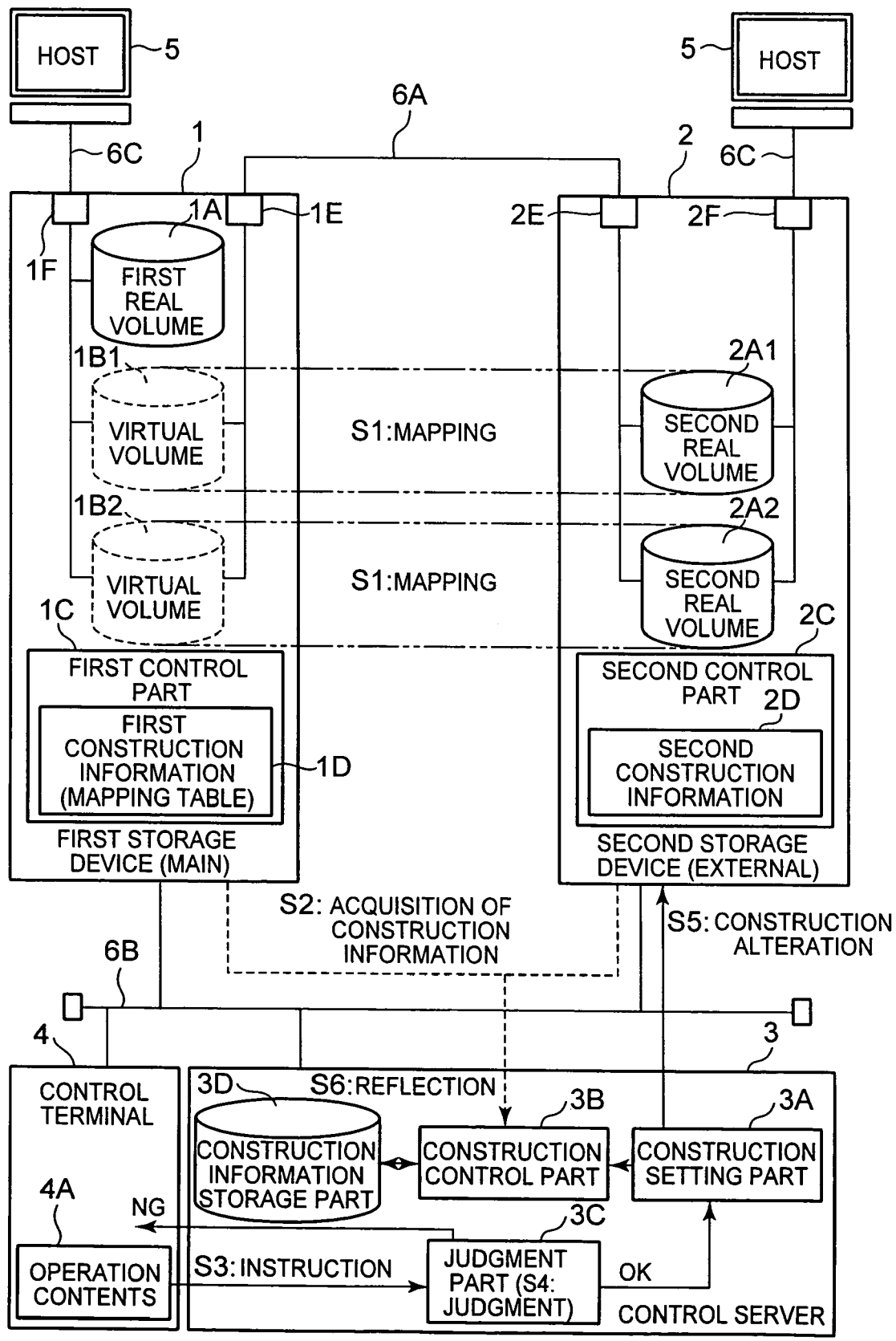
FIG. 1 is a block diagram which shows the overall construction of a storage system constituting an embodiment of the present invention.

FIG. 1 is a structural explanatory diagram which shows an overall schematic outline of an embodiment of the present invention. In this embodiment, as will be described later, an externally located storage device is incorporated into the system as though this external storage device were the system's own internal volume by mapping this external storage device into the system's own intermediate storage device (VDEV), and this storage device is provided to the host. Furthermore, in the present embodiment, the system is devised so that alterations in the construction of the respective storage control devices can be controlled in a unified manner, and destruction of the cooperation between external storage devices and internal volumes due to inadvertent operations is prevented in advance.

For example, the storage system of the present embodiment may comprise a first storage device 1 which is one example of the first storage control device, a second storage device 2 which is one example of the second storage control device, a control server 3 which is used as a managing device, a control terminal 4, and a host 5.

For example, the first storage device 1 is constructed as a disk array device. The first storage device 1 comprises a plurality of communications ports 1E and 1F. The first storage device 1 is connected to the port 2E of the second storage device 2 from the communications port 1E via a communications network 6A. Furthermore, the first storage device 1 is connected to the host 5 from the communications port 1F via a communications network 6C. Furthermore, the first storage device 1 is connected to the control server 3 via a communications network 6B.

Here, for example, the communications networks 6A and 6C can be constructed as networks that perform data communications on the basis of a fiber channel protocol as in an SAN (storage area network) or the like. Furthermore, for example, the communications network 6B that connects the respective storage devices 1 and 2 and the control server 3 can be constructed as a network that performs data communications on the basis of a TCP/IP (transmission control protocol/internet protocol) as in an LAN (local area network), WAN (wide area network) or the like. However, these are merely examples; there are no restrictions on the type of protocol used in the present invention.

The first storage device 1 can comprise a first real volume 1A, virtual volumes 1B1 and 1B2 as virtual volumes, and a first control part 1C. The first real volume 1A is a volume that is produced on the basis of a physical storage device (e. g., a disk drive or the like) inside the first storage device 1. The respective virtual volumes 1B1 and 1B2 have a virtual existence; the actual bodies that store data are located inside the second storage device 2. Specifically, the virtual volumes 1B1 and 1B2 are respectively constructed by respectively mapping second real volumes 2A1 and 2A2 of the second storage device 2 into specified strata of the storage hierarchy of the first storage device 1.

The first control part 1C is a controller that is used to control the overall operation of the first storage device 1. The first control part 1C holds first construction information 1D, and controls data input/output and the like on the basis of this first construction information 1D. For example, in addition to disk drive constructions, access control information that controls the access of the host 5, copying pair setting states and the like, a mapping table is contained in the first construction information 1D. A correspondence relationship between the respective virtual volumes 1B1 and 1B2 and the respective real volumes 2A1 and 2A2 is registered in the mapping table.

When an access request for the virtual volume 1B1 or 1B2 is issued from the host 5, the first control part 1C refers to the mapping table, accesses the real volume 2A1 or 2A2 of the second storage device 2, and reads or writes data. Accordingly, it appears as though the virtual volume 1B1 or 1B2 is being accessed from the host 5. However, the actual data storage destination is located inside the second storage device 2.

The second storage device 2 is connected to the first storage device 1 from the communications port 2E via the communications network 6A. Furthermore, the second storage device 2 is connected to the host 5 from the communications port 2F via the communications network 6C. Furthermore, the second storage device 2 is connected to the control server 3 via the communications network 6B.

For example, the second storage device 2 can be constructed so that this device comprises a plurality of second real volumes 2A1 and 2A2, and a second control part 2C. The respective second real volumes 2A1 and 2A2 are installed on the basis of physical storage devices that are installed inside the second storage device 2, and are respectively mapped into the respective virtual volumes 1B1 and 1B2 of the first storage device 1 as described above. The second control part 2C is a controller that is used to control the overall operation of the second storage device 2. The second control part 2C can perform data input/output and the localizer ID,e on the basis of second construction information 2D.

The control server 3 performs unified control of construction alterations of the storage system. For example, the control server 3 can be constructed so that this server comprises a construction setting part 3A, a construction control part 3B, a judgment part 3C, and a construction information storage part 3D.

The construction setting part 3A can alter the constructions of the respective storage devices 1 and 2 by issuing instructions to alter the construction to the first storage device 1 or second storage device 2. Examples of construction alterations include the production of volumes, the assignment of produced volumes to communications ports, the mapping of the virtual volumes 1B1 and 1B2 and real volumes 2A1 and 2A2, the setting of access attributes, the setting of access destinations of the host 5 and the like.

The construction control part 3B performs unified control of the respective storage devices 1 and 2. Construction information 1D and 2D for the respective storage devices 1 and 2 is respectively acquired by the construction control part 3B, and is stored in the construction information storage part 3D.

The judgment part 3C judges whether or not the construction altering operation input from the control terminal 4 can be performed, and inputs only operations judged to be performable into the construction setting part 3A. In the case of construction altering operations that have an effect on the cooperation, i. e., the mutual dependence relationship, of the first storage device 1 and second storage device 2, the performance of such operations is rejected by the judgment part 3C. On the other hand, in the case of construction altering operations that do not have an effect on the mutual dependence relationship of the first storage device 1 and second storage device 2, the judgment part 3C allows these operations to be performed. The judgment part 3C can judge whether or not the construction altering operations input from the control terminal 4 have an effect on the mutual dependence relationship by referring to the information stored in the construction information storage part 3D.

Here, for example, the mutual dependence relationship refers to the mapping constructions (inter-volume connection constructions) of the virtual volumes 1B1 and 1B2 of the first storage device 1 and real volumes 2A1 and 2A2 of the second storage device 2. The judgment part 3C prohibits construction altering operations that destroy these mapping constructions or the like.

For example, the judgment part 3C can prohibit the performance of operations that cancel inter-volume connection constructions on the side of the second storage device 2, unifying operations that join the real volumes 2A1 and 2A2 respectively associated with the virtual volumes 1B1 and 1B2 with other real volumes inside the second storage device 2, operations that assign the real volumes 2A1 and 2A2 to a communications port 2F other than the communications port 2E used for inter-volume connection constructions, operations that set copying pairs for the real volumes 2A1 and 2A2 and the like.

For example, in cases where a user who does not know that the real volumes 2A1 and 2A2 are connected to the first storage device 1 attempts to delete one or both of the real volumes 2A1 and 2A2, a connection between volumes currently in operation is cancelled by this construction altering operation. Accordingly, the judgment part 3C may prohibit such connection canceling operations on the side of the second storage device 2.

Furthermore, for example, there may be cases in which a single large-capacity volume is created by connecting a plurality of real volumes in order to handle a large-scale application program or the like. The volume capacity can be increased by connecting a plurality of real volumes. Alternatively, in cases where there are limits to the number of LUs assigned to a port, the apparent number of LUs can be reduced by connecting a plurality of volumes to form a single volume, thus allowing the efficient utilization of ports.

However, if either of the real volumes 2A1 or 2A2 already connected to the virtual volumes 1B1 or 1B2 is connected to another volume, or if the real volumes 2A1 and 2A2 are connected to each other, the inter-volume connection construction formed across the storage devices 1 and 2 is destroyed. Accordingly, the judgment part 3C can prohibit in advance operations in which the real volumes 2A1 and 2A2 associated with virtual volumes are connected to other real volumes.

Furthermore, for example, in cases where real volumes 2A1 and 2A2 connected to virtual volumes 1B1 and 1B2 via the communications port 2E are also assigned to another communications port 2F, there is a possibility that the host 5 may access the real volumes 2A1 and 2A2 via this communications port 2F and update the data. In this case, mismatching is generated in the storage contents between the virtual volumes and the real volumes, so that a correct operation cannot be performed. Accordingly, the judgment part 3C can prohibit assignment to other communications ports in advance, so that real volumes connected to virtual logical volumes are not inadvertently rewritten.

Furthermore, if the access attribute of "read only" is set for real volumes that are connected to virtual volumes, there may be cases in which there is no objection to assigning these real volumes to other communications ports. Real volumes cannot be updated from other communications ports, so that no mismatching is generated in the storage contents.

Furthermore, in cases where real volumes 2A1 and 2A2 connected to virtual volumes 1B1 and 1B2 form copying pairs with other volumes, there is a possibility that the storage contents of the real volumes 2A1 and 2A2 will be updated so that mismatching is generated in the same manner as described above. For example, such cases include cases in which one or both of the real volumes 2A1 and 2A2 are set as copying destination volumes. Accordingly, the judgment part 3C can prohibit in advance copying pair setting operations for the real volumes 2A1 and 2A2. On the other hand, in cases where the real volumes 2A1 and 2A2 are set as copying source volumes, there is no alteration in the storage contents; accordingly, operations that set these volumes as copying source volumes can be permitted.

The construction setting part 3A performs construction altering operations that are permitted by the judgment part 3C. In concrete terms, commands or data used to realize the contents of permitted construction alterations are transmitted to the object storage device, and the construction of the object storage device is altered. When the construction alteration is completed, the construction control part 3B updates the storage contents of the construction information storage part 3D. As a result, the most recent information relating to the construction of the storage system can be obtained.

For example, the control terminal 4 can be constructed as a computer system such as a personal computer, portable information terminal or the like. For example, the control terminal 4 comprises a user interface such as a web browser or the like. The control terminal 4 and control server 3 are connected via the communications network 6B. The control terminal 4 can log into the control server 3, and can give instructions for various types of operation contents, or can read out various types of information relating to the storage system from the control server 3, and can display this information on the terminal screen.

As was already describe with respect to some of the operations, the overall operation of the storage system may be simply described as follows: namely, a user such as the system manager or the like logs into the control server 3 via the control terminal 4, respectively produces virtual volumes 1B1 and 1B2 and real volumes 2A1 and 2A2, and assigns these volumes to specified communications ports. Then, the user respectively maps the real volumes 2A1 and 2A2 into the virtual volumes 1B1 and 1B2, and connects both sets of volumes (S1). As a result, the first storage device 1 incorporates the memory resources of the second storage device 2, and can provide these resources to the host 5.

For example, the control server 3 respectively acquires information 1D and 2D relating to the construction of the storage system at a specified timing such as the time that discovery is performed or the like (S2). The respective sets of construction information 1D and 2D thus acquired are stored in the construction information storage part 3D. The respective sets of construction information 1D and 2D can be acquired in accordance with a request for such an indication by the user. The present invention is not limited to this; for example, a time at which the load on the storage system is low can be selected, and the control server 3 can respectively acquire construction information 1D and 2D from the respective storage devices 1 and 2 either periodically or at irregular intervals.

Next, the user inputs the desired operation contents 4A into the control server 3 via the control terminal 4 (S3). The judgment part 3C of the control server 3 refers to the information stored in the construction information storage part 3D via the construction control part 3B, and judges whether or not the operation contents 4A requested by the user are permitted or not (S4). In cases where the operation contents 4A are rejected, an indication of this is transmitted to the control terminal 4, and this indication is displayed on the terminal screen. Furthermore, error notification is not limited to a screen display; for example, this notification can also be performed by means of a voice output or the like. Furthermore, at the time of error notification, the reasons for the prohibition of the performance of the operation contents 4A may also be indicated.

The user can alter the operation contents to correct contents on the basis of the error notification. When the correct operation contents 4A are input from the control terminal 4, the judgment part 3C permits the execution of these operation contents 4A (S4). On the basis of these affirmative judgment results, the construction setting part 3A sends instructions for construction alteration to the object storage device in order to realize the operation contents 4A requested by the user (S5). The storage device receiving these instructions for construction alteration (i. e., the second storage device 2 in the figures) alters the construction on the basis of the instruction contents. As a result, the construction information for this storage device (D2 in the figures) is updated.

When the construction alteration performed by the construction setting part 3A is completed, the construction control part 3B causes the altered contents to be reflected in the information stored in the construction information storage part 3D (S6). As a result, the control server 3 can obtain information relating to the most recent construction without newly acquiring respective construction information 1D and 2D from the respective storage devices 1 and 2. However, this present invention is not limited to this; it would also be possible to use a construction in which respective sets of construction information 1D and 2D are acquired from the respective storage devices 1 and 2, and the storage contents of the construction information storage part 3D are updated, each time that a construction alteration is performed.

Thus, in the present embodiment, the first storage device 1 can incorporate and utilize real volumes 2A1 and 2A2 of the second storage device 2 as its own virtual volumes 1B1 and 1B2.

Furthermore, in the present embodiment, construction altering operations that destroy the mutual dependence relationship of the first storage device 1 and second storage device 2 or the like are prohibited in advance. Accordingly, even in cases where the first storage device 1 and second storage device 2 are cooperating, the construction of the storage system can be stably altered, so that the convenience and reliability are improved. The present embodiment will be described in greater detail below.

1. First Embodiment

Figure 2:
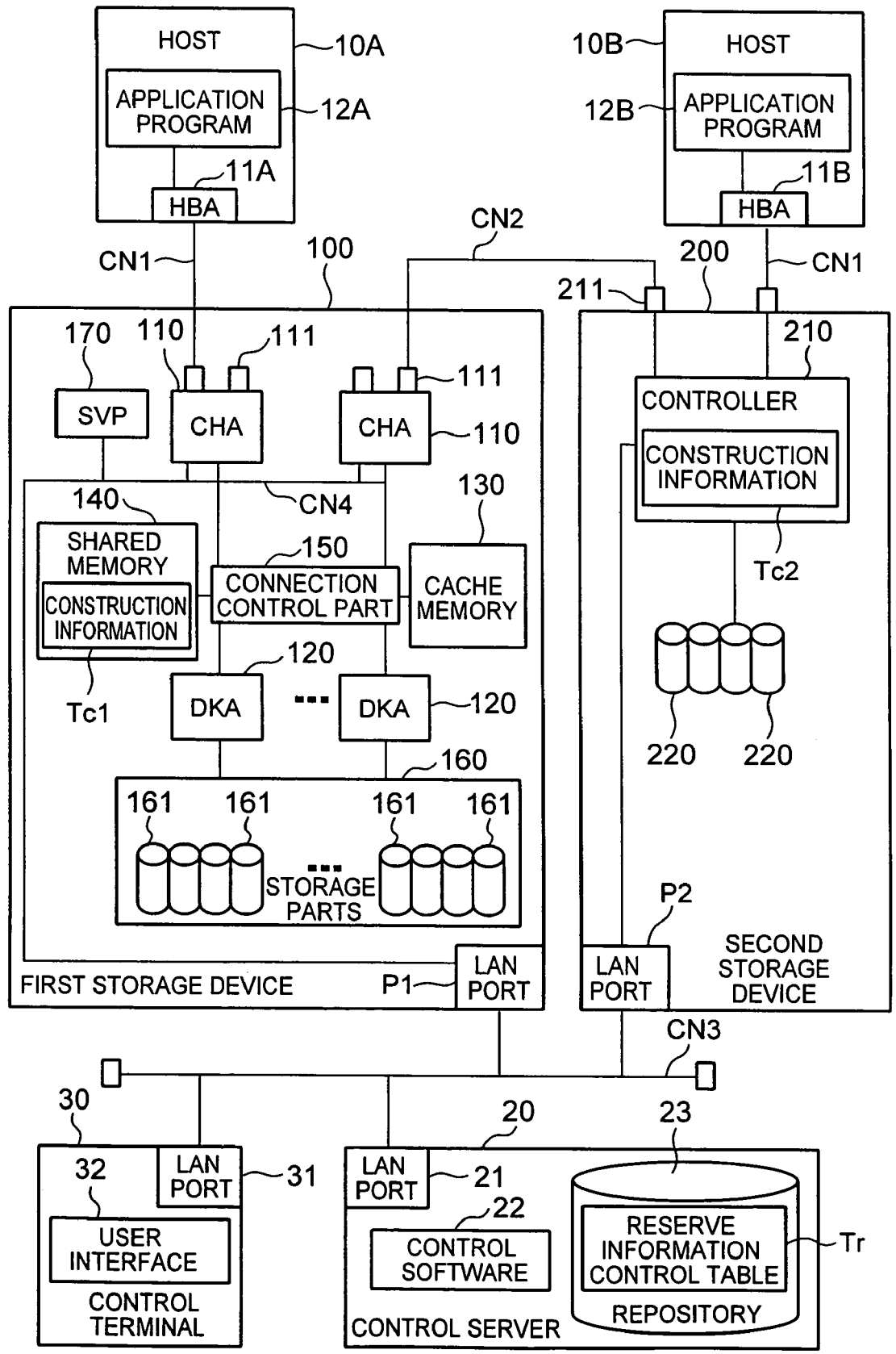
FIG. 2 is a block diagram of the storage system.

FIG. 2 is a block diagram which shows the construction of the essential parts of a storage system constructed according to the present embodiment. For example, as will be described later, this storage system can be constructed so that this system comprises one or a plurality of hosts 10A and 10B, a control server 20, a control terminal 30, and a plurality of storage devices 100 and 200.

The respective hosts 10A and 10B and respective storage devices 100 and 200 are connected via a communications network CN1. The first storage device 100 and second storage device 200 are connected via a communications network CN2. The respective storage devices 100 and 200 and the control server 20 are connected via a communications network CN3. Furthermore, the control terminal 30 is connected to the control server 20 via the communications network CN3.

For example, the hosts 10A and 10B are computer devices comprising a information processing resources such as a CPU (central processing unit), memory and the like; for instance, these hosts are constructed as personal computers, work stations, main frames or the like.

The host 10A comprises an HBA (host bus adapter) 11A which is used to access the first storage device 100 via the communications network CN1, and an application program 12A such as (for example) data base software or the like. Similarly, the host 10B also comprises an HBA 11B which is used to access the second storage device 200, and an application program 12B. Below, in cases where no particular distinction is made between the respective hosts 10A and 10B, these parts will be referred to simply as hosts 10, HBAs 11 and application programs 12.

For example, an LAN (local area network), an SAN (storage area network), the internet, a dedicated circuit, a public circuit or the like can be appropriately used as the communications network CN1 depending on the case. For example, data communications via an LAN are performed according to a TCP/IP protocol. In cases where a host 10 is connected to the first storage device 100 or second storage device 200 via an LAN, the host 10 requests the input and output of data in file units by designating file names.

On the other hand, in cases where a host 10 is connected to the first storage device 100 or second storage device 200 via an SAN, the host 10 requests the input and output of data in block units (which are the data control units of the storage region provided by a plurality of disk storage devices (disk drives) according to a fiber channel protocol. In cases where the communications network CN1 is an LAN, the HBA 11 is (for example) a network card that handles an LAN. In cases where the communications network CN1 is an SAN, the HBA 11 is (for example) a host bus adapter.

Furthermore, in cases where the host 10 is constructed as a main frame, the host 10 performs data transfer according to a communications protocol such as (for example) FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

The control server 20 is a computer device which is used to control the construction and the like of the storage system; for example, this server is operated by a user such as a system manager or the like. The control server 20 is respectively connected to the respective storage devices 100 and 200 and the control terminal 30 via the communications network CN3. For example, the control server 20 can be constructed so that this server comprises an LAN port 21 which is used for connection to the communications network CN3, control software 22, and a repository (data base) 23. A reserve information control table Tr can be included in the repository 23. As will be described later, the control server 20 controls construction alterations of the respective storage devices 100 and 200 in a unified manner, and prevents the execution of erroneous construction alterations in advance.

The control terminal 30 is connected to the control server 20 via the communications network CN3, and exchanges information with the control server 20. For example, the control terminal 30 can be constructed so that this terminal comprises an LAN port 31 which is used to connect the terminal to the communications network CN3, and a user interface 32 such as a web browser or the like. The control terminal 30 can send various types of instructions to the control server 20. Furthermore, the control terminal 30 can also acquire information relating to the state of the storage system from the control server 20, and can display this information on the terminal screen.

For example, the first storage device 100 is constructed as a disk array subsystem. However, the present invention is not limited to this; the first storage device 100 can also be constructed as a highly functionalized intelligent type fiber channel switch. As will be described later, the first storage device 100 provides memory resources of the second storage device 200 to the host 10 as its own logical volumes (logical units). Specifically, the first storage device 100 is the main storage in the storage system. On the other hand, the second storage device 200 is an external storage that is used by the first storage device 100 constituting the main storage.

The first storage device 100 can be roughly divided into a controller and a storage part 160. For example, the controller can be constructed so that this controller comprises a plurality of channel adapters (hereafter abbreviated to "CHAs") 110, a plurality of disk adapters (hereafter abbreviated to "DKAs") 120, a cache memory 130, a shared memory 140, and a connection control part 150.

The respective CHAs 110 perform data communications with the host 10. The respective CHAs 110 comprise communications ports 111 for performing communications with the host 10. Each CHA 110 is constructed as a microcomputer system comprising a CPU, memory and the like; these CHAs 110 select and execute various types of commands received from the host 10. A network address (e. g., an IP address or WWN) used to discriminate the CHA is assigned to each CHA 110, and each CHA 110 can also behave separately as an NAS (network attached storage). In cases where there are a plurality of hosts 10, each CHA 110 receives and processes requests from the respective hosts 10 separately.

The respective DKAs 120 are parts that perform data exchange with the disk drives 161 of the storage part 160. Like the CHAs 110, the respective DKAs 120 are constructed as microcomputer systems comprising a CPU, memory and the like. For example, the respective DKAs 120 write data received from the host 10 by the CHAs 110 and data read out from the second storage device 200 into specified addresses of specified disk drives 161. Furthermore, the respective DKAs 120 read out data from specified addresses of specified disk drives 161, and transmit this data to the host 10 or second storage device 200. In cases where data input/output is performed with a disk drive 161, the respective DKAs 120 convert logical addresses into physical addresses. In cases where the disk drives 161 are controlled in accordance with an RAID, the respective DKAs 120 perform data access according to an RAID construction. For example, the respective DKAs 120 respectively write the same data into separate disk drive groups (RAID groups), or perform parity calculations and write the data and parity into the disk drive groups.

The cache memory 130 stores data received from the host 10 or second storage device 200, or stores data read out from the disk drives 161. As will be described later, a virtual intermediate storage device is constructed using the storage space of the cache memory 130.

Various types of control information and the like used in the operation of the first storage device 100 are stored in the shared memory (also called a control memory in some cases) 140. Construction information Tc1 described later is included as one type of this control information. Furthermore, in addition to the setting of work regions, various types of tables such as a mapping table (described later) and the like are also stored in the shared memory 140.

Furthermore, one or a plurality of the disk drives 161 can also be used as a cache disk. Moreover, the cache memory 130 and shared memory 140 can be constructed as respectively separate memories, or a storage region in one portion of the same memory can be used as a cache region, and another storage region can be used as a control region.

The connection control part 150 connects the respective CHAs 110, the respective DKAs 120, the cache memory 130 and the shared memory 140 to each other. For example, the connection control part 150 can be constructed as a high-speed bus such as an ultra-high-speed cross bar switch that performs data transfer by means of a high-speed switching action.

The storage part 160 comprises a plurality of disk drives 161. Various types of storage devices such as hard disk drives, flexible disk drives, magnetic tape drives, semiconductor memory drives, optical disk drives and the like, or the equivalents of such drives, can be used as the disk drives 161. Furthermore, for example, different types of disks may be mixed inside the storage part 160, as in FC (fiber channel) disks, SATA (serial AT attachment) disks or the like.

Furthermore, as will be described later, a virtual internal volume 163V based on a disk drive 220 of the second storage device 200 can be formed in the first storage device 100. This virtual internal volume 163V can be provided to the host 10A in the same manner as the internal volume 163 based on the disk drive 161.

For example, the SVP (service processor) 170 is respectively connected to the respective CHAs 110 via an internal communications network CN4. Furthermore, the SVP 170 can also access the shared memory 140 or the like via one or a plurality of CHAs 110. The SVP 170 can collect various types of information inside the storage device 100, and can output this information to the control server 20. Furthermore, in accordance with instructions from the control server 20, the SVP 170 can rewrite construction information Tc1 inside the shared memory 140, and can alter the construction of the storage device 100.

For example, the second storage device 200 comprises a controller 210 and a plurality of disk drives 220. The controller 210 comprises construction information D2. The second storage device 200 is respectively connected with the host 10B, control server 20 and first storage device 100 via the communications port 211 so that communications are possible.

The second storage device 200 and host 10B are connected via the communications network CN1. The second storage device 200 and control server 20 are connected via the communications network CN3. The second storage device 200 and first storage device 100 are connected via the communications network CN2. For example, the communications networks CN2 and CN3 can be constructed from SAN, LAN or the like. In the present embodiment, the storage devices are connected by an SAN, and the control server 20 and respective storage devices 100 and 200 are connected by an LAN.

The second storage device 200 may have substantially the same construction as the first storage device 100, or may have a simpler construction than the first storage device 100. The disk drives 220 of the second storage device 200 may be handled as internal storage devices of the first storage device 100.

Figure 3:
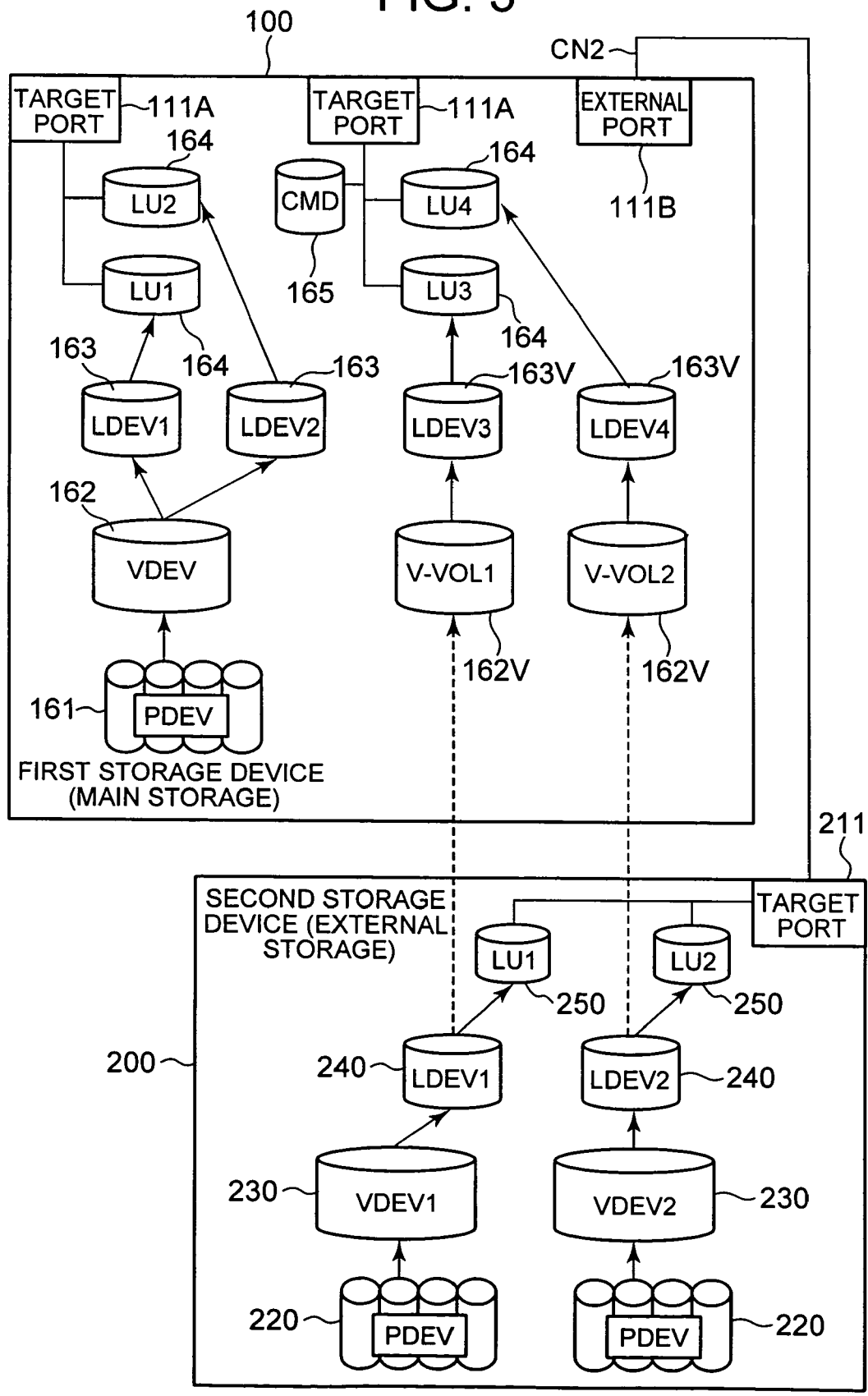
FIG. 3 is an explanatory diagram which shows the storage structure of the storage system in model form.

Reference is now made to FIG. 3. FIG. 3 is a structural explanatory diagram focusing on the storage structure of the first storage device 100 and second storage device 200. First, the construction of the first storage device 100 will be described.

For example, the storage structure of the first storage device 100 can be roughly divided into a physical storage hierarchy and a logical storage hierarchy. The physical storage hierarchy is constituted by PDEVs (physical devices) 161 which are physical disks. The PDEVs correspond to disk drives.

The logical storage hierarchy can be constructed from a plurality (e. g., two types) of hierarchies. One logical hierarchy can be constructed from VDEVs (virtual devices) 162 and virtual VDEVs (hereafter called "V-VOLs") 162V which can be handled as VDEVs 162. The other logical hierarchy can be constructed from LDEVs (logical devices) 163.

For example, the VDEVs 162 can be constructed by forming a specified number of PDEVs 161 into a group, e. g., four units as one set (3D+1P), eight units as one set (7D+1P) or the like. One RAID storage region is formed by the aggregate of the storage regions provided by the respective PDEVs 161 belonging to a group. This RAID storage region constitutes a VDEV 162.

In contrast to the construction of a VDEV 162 in a physical storage region, the V-VOL 162V is a virtual intermediate storage device that does not require a physical storage region. The V-VOL 162V is not directly associated with a physical storage region, but is a receiver for the mapping of LUs (logical units) of the second storage device 200.

One or more LDEVs 163 can be respectively disposed in the VDEV 162 or V-VOL 162V. For example, the LDEVs 163 can be constructed by splitting a VDEV 162 into specified lengths. In cases where the host 10 involved is an open type host, the host 10 can recognize the LDEV 163 as a single physical disk by mapping the LDEV 163 in the LU 164. The open type host can access a desired LDEV 163 by designating the LUN (logical unit number) or logical block address. Furthermore, in the case of a main frame type host, the LDEV 163 can be directly accessed.

The LU 164 is a device that can be recognized as an SCSI logical unit. The respective LUs 164 are connected to the host 10 via a target port 11A. One or more LDEVs 163 can be respectively associated with each LU 164. It is also possible to expand the LU size in virtual terms by associating a plurality of LDEVs 163 with one LU 164.

The CMD (command device) 165 is a special LU that is used to transfer commands and status information between the I/O control program operating in the host 10 and the controller (CHAs 110, DKAs 120) of the storage device 100. Commands from the host 10 are written into the CMD 165. The controller of the storage device 100 executes processing corresponding to the commands that are written into the CMD 165, and writes the results of this execution into the CMD 165 as status information. The host 10 reads out and confirms the status information that is written into the CMD 165, and then writes the processing contents that are to be executed next into the CMD 165. Thus, the host 10 can issue various types of instructions to the storage device 100 via the CMD 165.

Furthermore, the commands received from the host 10 can also be processed without being stored in the CMD 165. Moreover, the CMD can also be formed as a virtual device without defining the actual device (LU), and can be constructed so as to receive and process commands from the host 10. Specifically, for example, the CHAs 110 write the commands received from the host 10 into the shared memory 140, and the CHAs 110 or DKAs 120 process the commands stored in this shared memory 140. The processing results are written into the shared memory 140, and are transmitted to the host 10 from the CHAs 110.

The second storage device 200 is connected to the external connection initiator port (external port) 111B of the first storage device 100 via the communications network CN2.

The second storage device 200 comprises a plurality of PDEVs 220, VDEVs 230 that are set in storage regions provided by the PDEVs 220, and one or more LDEVs 240 that can be set in the VDEVs 230. Each LDEV 240 is respectively associated with an LU 250.

Furthermore, in the present embodiment, the LUs 250 (i. e., the LDEVs 240) of the second storage device 200 are mapped into a V-VOL 162V which is a virtual intermediate storage device so that these LUs 250 can also be used from the first storage device 100.

For example, in FIG. 3, the "LDEV 1" 240 and "LDEV 2" 240 of the second storage device 200 are respectively mapped into the "V-VOL 1" 162V and "V-VOL 2" 162V of the first storage device 100 via the "LU 1" 250 and "LU 2" 250 of the second storage device 200. Furthermore, the "V-VOL 1" and "V-VOL 2" are respectively mapped into the "LDEV 3" 163V and "LDEV 4" 163V, and can be utilized via the "LU 3" 164 and "LU 4" 164.

Furthermore, the VDEVs 162 and V-VOLs 162V can use an RAID construction. Specifically, one disk drive can be divided into a plurality of VDEVs 162 and V-VOLs 162V (slicing), or one VDEV 162 or V-VOL 162V can be formed from a plurality of disk drives (striping).

The "LDEV 1" or "LDEV 2" of the first storage device 100 corresponds to a real internal volume, and the "LDEV 3" or "LDEV 4" corresponds to a virtual volume. The "LDEV 1" or "LDEV 2" of the second storage device 200 is a real volume. Furthermore, in the case of viewing centering on the first storage device 100, the second storage device 200 is an external storage, and the logical volume 240 of the second storage device 200 is a external volume.

Figure 4:
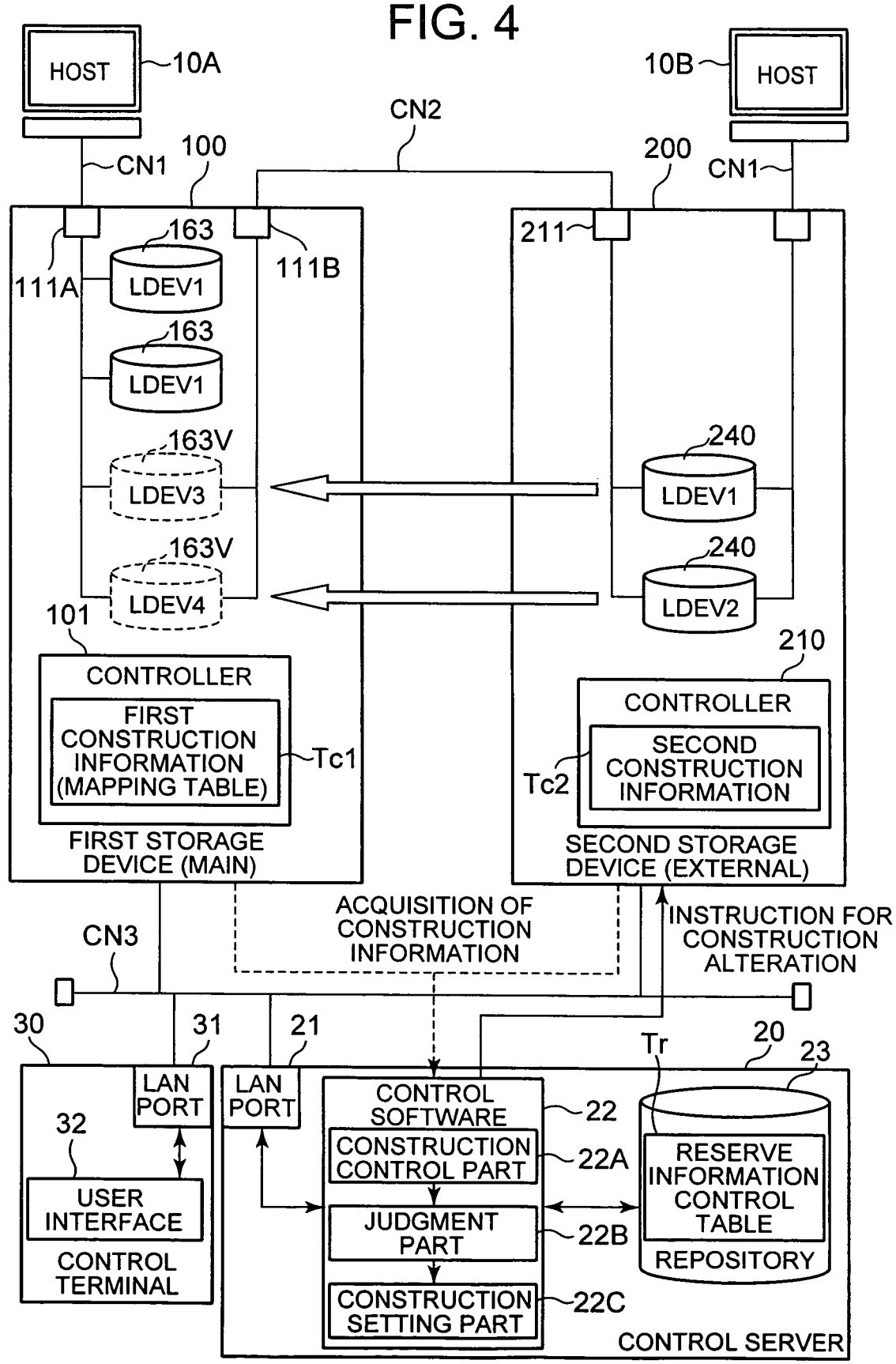
FIG. 4 is an explanatory diagram which shows a schematic outline of the functional construction of the storage system.

Reference is now made to FIG. 4. FIG. 4 is a structural explanatory diagram focusing on the functional construction of the present embodiment. The controller 101 of the first storage device 100 is constructed from respective CHAs 110, respective DKAs 120, a cache memory 130 and a shared memory 140.

This controller 101 stores construction information Tc1 including a mapping table T1 and the like (described later) in the shared memory 140. Real internal volumes 163 and virtual volumes 163V are respectively disposed in the first storage device 100. The internal volumes 163 are volumes set on the basis of the storage regions of respective disk drives 161 that are directly governed by the first storage device 100. The virtual volume 163V are volumes that are set on the basis of the storage regions of respective disk drives 220 of the second storage device 200.

The controller 210 of the second storage device 200 stores construction information Tc2 in a memory not shown in the figures. The second storage device 200 comprises a plurality of real volumes 240. These respective real volumes 240 are produced on the basis of the storage regions of the disk drives 220. The respective real volumes 240 are mapped into the virtual volumes 163V of the first storage device 100, and are arranged as though these volumes are incorporated into the first storage device 100.

The control software 22 of the control server 20 can comprise a construction control part 22A, a judgment part 22B and a construction setting part 22C as internal functions. The construction control part 22A respectively acquires construction information Tc1 and Tc2 from the respective storage devices 100 and 200, and registers and controls this construction information Tc1 and Tc2 in the reserve information control table Tr. One example of the updating period of the reserve information control table Tr will be described later.

The judgment part 22B judges whether or not the construction altering operation input from the control terminal 30 is performable, and inputs the contents of the construction altering operation into the construction setting part 22C in cases where this operation is permissible. The term construction altering operation refers to an operation that is used to alter the construction of the storage system; examples of such construction altering operations include the production of volumes, the assignment of communications ports to volumes, the mapping of volumes, the setting of copying pairs and the like.

The judgment part 22B judges whether or not a construction altering operation input from the control terminal 30 has an effect on the connection constructions of the virtual volumes 163V and real volumes 240. The judgment part 22B rejects the execution of operations that have an effect on connection constructions, and permits the execution of operations that do not have an effect on connection constructions.

The construction setting part 22C alters the constructions of the respective storage devices 100 and 200 on the basis of the construction altering operations. The construction setting part 22C realizes only operations that are permitted by the judgment part 22B. The construction setting part 22C sends the instructions required for alteration of the construction to the object storage device.

Reference is now made to FIG. 5. FIG. 5 shows one example of the mapping table T1 that is used to map real volumes 240 of the second storage device 200 into virtual volumes 163V of the first storage device 100.

For example, the mapping table T1 can be constructed by respectively associating VDEV numbers that are used to respectively discriminate the V-VOLS 162V, and information for the external disk drives 220. In the mapping table T1, since the V-VOLs 162V are handled as virtual VDEVs, an indication of "VDEV" is included in FIG. 5. In actuality, however, a correspondence between V-VOLs 162V and external disk drives 220 is stipulated.

For example, the external device information can be constructed so that this information includes device discriminating information, the storage capacities of the disk drives 220, information that indicates the type of device (e. g., tape type device or disk type device or the like), and path information indicating the paths to the disk drives 220. The path information can be constructed so as to include discriminating information (WWN) specific to the respective communications ports 211, and LUN numbers used to discriminate the LUs 250.

Furthermore, the device discriminating information, WWN and the like shown in FIG. 5 are values that are used for convenience of description, and do not have any particular significance. Moreover, three sets of path information are associated with the V-VOL having the VDEV number "3" shown in the lower part of FIG. 5. Specifically, the external disk drive 220 that is mapped into this VDEV (#3) has an alternate path structure that has three paths inside. Mapping is performed in this VDEV (#3) with this alternate path structure being recognized. It is ascertained that the same storage region can be accessed via any of these three paths. Accordingly, even in cases where trouble or the like occurs in one or two of these paths, the desired data can be accessed via the remaining normal paths.

By using the mapping table T1 shown in FIG. 5, it is possible to map one or a plurality of external disk drives 220 in the V-VOLs 162V inside the first storage device 100.

Furthermore, the same is true in the other tables described below. The volume numbers and the like in the tables are examples used to illustrate the table construction, and do not particularly correspond to the numbers in the other constructions shown in FIGS. 3, 4 and the like.

Figure 6:
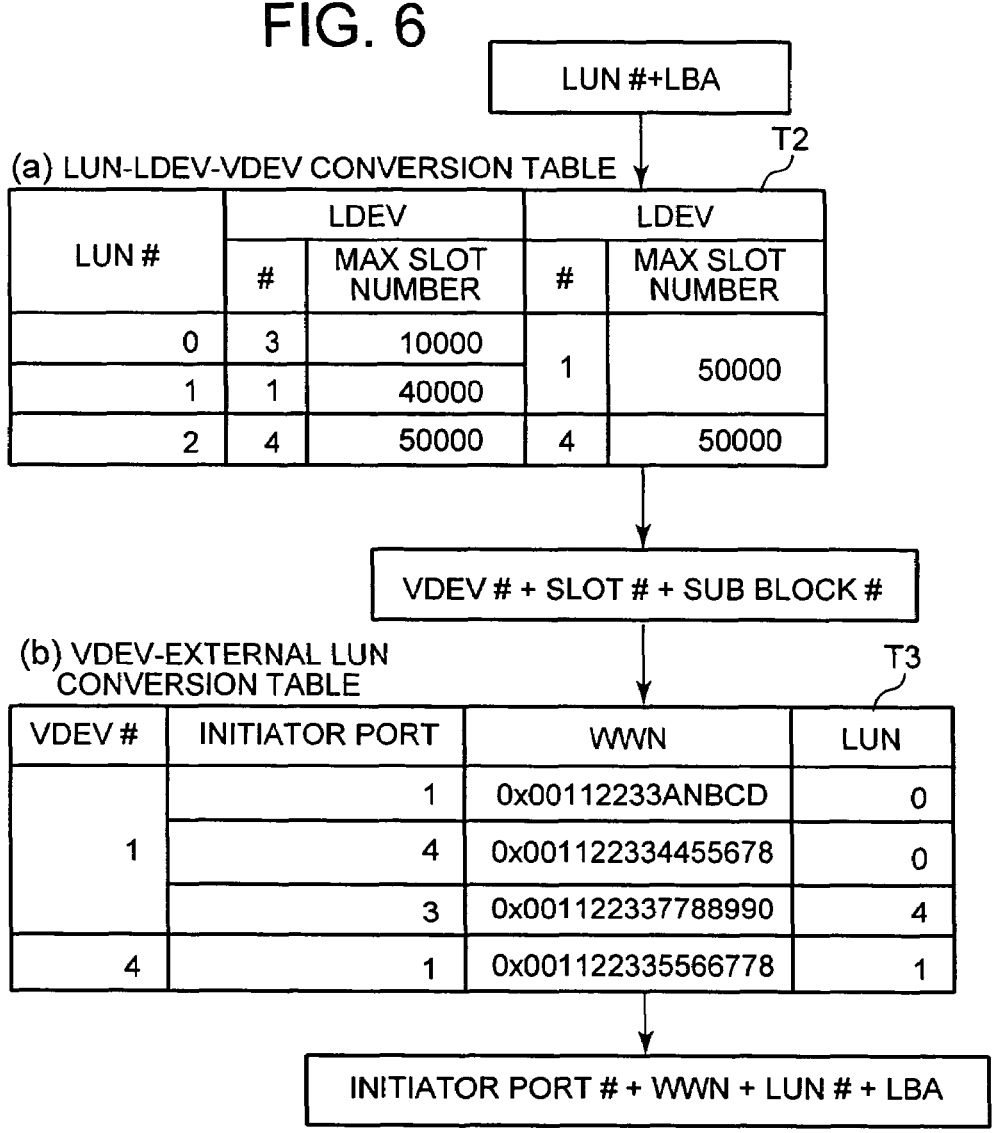
FIG. 6 is an explanatory diagram which shows how address conversion is performed in cases where data is written into an external volume that is incorporated as a virtual volume.

The conditions of data conversion using the respective tables will be described with reference to FIG. 6. As is shown in the upper part of FIG. 6, the host 10 transmits data to a specified communications port 111 by designating the LUN number (LUN #) and logical block address (LBA).

The first storage device 100 converts the data (LUN #+LBA) used for the LDEVs into data for VDEV use on the basis of the first conversion table T2 shown in FIG. 6(a). The first conversion table T2 is an LUN-LDEV-VDEV conversion table that is used to convert data designating the LUNs inside the first storage device 100 into VDEV data.

For example, this first conversion table T2 is constructed by associating LUN numbers (LUN #), LDEV numbers (LDEV #) and maximum slot numbers that correspond to correspond to these LUNs, VDEV (including V-VOL) numbers (VDEV #) and maximum slot numbers that correspond to these LDEVs and the like. As a result of reference being made to this first conversion table T2, the data from the host 10 (LUN #+LBA) is converted into VDEV data (VDEV #+SLOT #+SUBBLOCK #).

Next, the first storage device 100 refers to the second conversion table T3 shown in FIG. 6(b), and converts the VDEV data into data that is used for transmission and storage for the LUNs of the second storage device 200.

In the second conversion table T3, for example, VDEV numbers (VDEV #), the numbers of initiator ports used to transmit data from the VDEVs to the second storage device 200, WWN used to specify the communications ports that are the data transfer destinations and LUNs that can be accessed via these communications ports are associated.

On the basis of this second conversion table T3, the first storage device 100 converts the address information of the data that is to be stored into the format of initiator port number #+WWN+LUN #+LBA. The data whose address information has thus been altered reaches the designated communications port 211 from the designated initiator port via the communications network CN2. Then, the data is stored in a specified place in the LDEV.

FIG. 6(c) shows another second conversion table T3a. This conversion table T3a is used in cases where a stripe or RAID is applied to VDEVs (i. e., V-VOLs) originating in an external disk drive 220. The conversion table T3a is constructed by associating VDEV numbers (VDEV #), stripe sizes, RAID levels, numbers used to discriminate the second storage device 200 (SS # (storage system numbers)), initiator port numbers and WWN and LUN numbers of the communications ports 211.

In the example shown in FIG. 6(c), one VDEV (V-VOL) constructs an RAID 1 utilizing a total of four external storage control devices specified by SS # (1, 4, 6, 7). Furthermore, the three LUNs (#0, #0 and #4) assigned to SS # 1 are set in the same device (LDEV #). Moreover, the volumes of LUN #0 comprise an alternate path structure which has two access data paths. Thus, logical volumes (LDEVs) belonging respectively to a plurality of external storage device can be respectively mapped in a single V-VOL inside the first storage device 100, and can be utilized as a virtual volume 163V. As a result, in the present embodiment, by constructing a VDEV (V-VOL) from a plurality of logical volumes (LDEV) present on the outside, it is possible to add functions such as striping, RAID or the like, and to provide these functions to the host 10.

FIG. 7 is an explanatory diagram showing one example of the access attribute control table T4. The access attributes constitute information that controls the possibility of access to the volumes and the like. For example, the access attribute control table T4 can be constructed by associating access attributes with each LU number (LUN), Examples of access attributes include "read/write possible", "write prohibited (read only)", "read/write impossible", "empty capacity 0", "copying destination setting impossible", "hidden" and the like.

Here, "read/write possible" indicates a state in which reading and writing from and into the volume in question are possible. "Write prohibited" indicates a state in which writing into the volume in question is prohibited, so that only read-out is permitted. "Read/write impossible" indicates a state in which writing and reading into and from the volume are prohibited. "Empty capacity 0" indicates a state in which a response of remaining capacity 0 (full) is given in reply to inquiries regarding the remaining capacity of the volume even in cases where there is actually some remaining capacity. "Copying destination setting impossible" indicates a state in which the volume in question cannot be set as the copying destination volume (secondary volume). "Hidden" indicates a state in which the volume in question cannot be recognized from the initiator. Furthermore, as was already mentioned above, the LUNs in the table are numbers used for purposes of description; these numbers in themselves have no particular significance.

Next, data input and output between the first storage device 100 and second storage device 200 will be described. FIG. 8 is a model diagram showing the processing in the case of data writing. The host 10 can write data into a logical volume (LDEV) that has access authorization. For example, by using procedures such as zoning that sets a virtual SAN subnet in the SAN or LUN masking in which the host 10 holds a list of accessible LUNs, it is possible to set the host 10 so that the host 10 can access only specified LDEVs.

In cases where the LDEV into which the host 10 is to write data is connected via a VDEV to a disk drive 161 which is an internal storage device, data is written by ordinary processing. Specifically, the data from the host 10 is temporarily stored in the cache memory 130, and is then stored in a specified address of a specified disk drive 161 from the cache memory 130 via the DKA 120. In this case, the DKA 120 converts the logical address into a physical address. Furthermore, in the case of a RAID construction, the same data is stored in a plurality of disk drives 161 or the like.

Figure 8A:
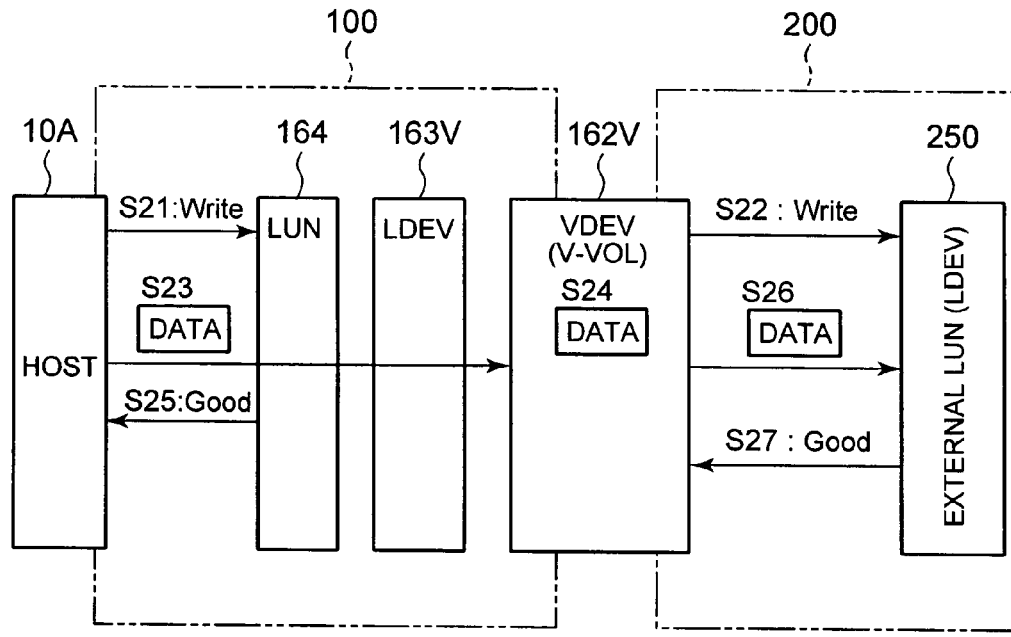
FIG. 8 is a schematic diagram showing a case in which data is written into an external storage device used as a virtual volume.
Figure 8B:
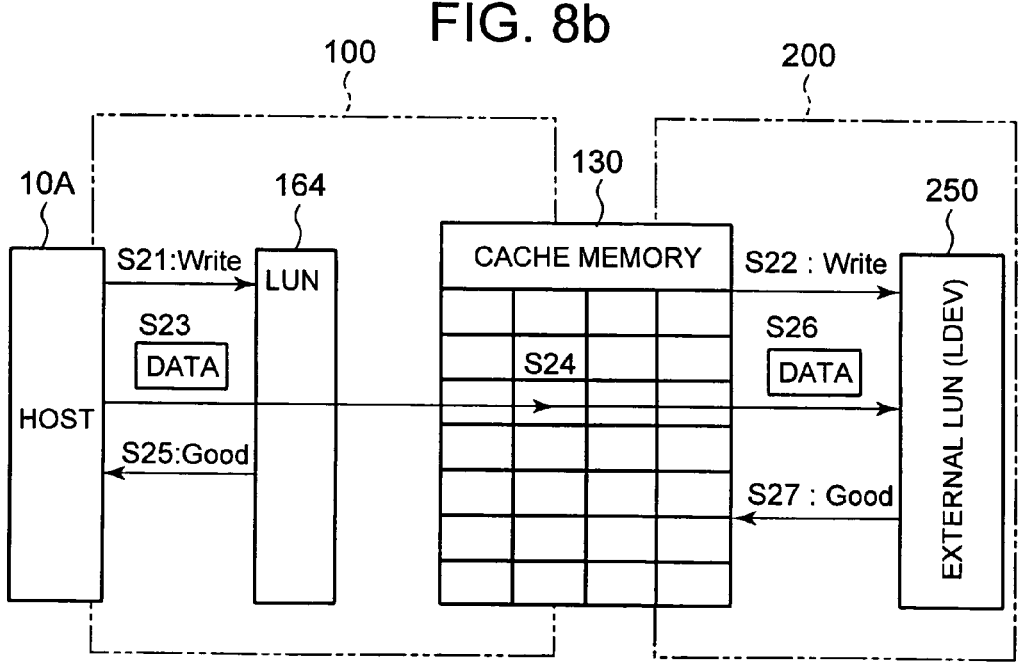

On the other hand, in cases where the LDEV into which the host 10 is to write data is connected to an external disk drive 220 via a V-VOL, the flow is as shown in FIG. 8. FIG. 8(a) is a flow chart centering on the storage hierarchy, and FIG. 8(b) is a flow chart centering on the manner of use of the cache memory 130.

The host 10 indicates an LDEV number that specifies the LDEV that is the object of writing and a WWN that specifies the communications port 111 that is used to access this LDEV, and issues a write command (write) (S21). When the first storage device 100 receives a write command from the host 10, the first storage device 100 produces a write command for transmission to the second storage device 200, and transmits this command to the second storage device 200 (S22). The first storage device 100 alters the address information and the like contained in the write command received from the host 10 so as to match the external volume 240, thus producing a new write command.

The host 10 transmits the write data to the to the first storage device 200 (S23). The write data received by the first storage device 100 is transferred to the second storage device 200 (S26) from the LDEV via the V-VOL (S24). Here, at the point in time at which the data from the host 10 is stored in the cache memory 130, the first storage device 100 sends back a response (good) indicating the completion of writing to the host 10 (S25).

At the point in time at which the write data is received from the first storage device 100 (or the point in time at which writing into the disk drive 220 is completed), the second storage device 200 transmits a writing completion report to the first storage device 100 (S26). Specifically, the time at which the completion of writing is reported to the host 10 by the first storage device 100 (S25) and the time at which the data is actually stored in the disk drive 220 are different (asynchronous system). Accordingly, the host 10 is released from data write processing before the write data is actually stored in the disk drive 220, so that the host 10 can perform other processing.

Reference will now be made to FIG. 8(b). Numerous subprograms are installed in the cache memory 130. The first storage device 100 converts the logical block addresses designated by the host 10 into sub-block addresses, and stores data in specified locations in the cache memory 130 (S24). In other words, the V-VOLs and VDEVs have a logical presence installed in the storage space of the cache memory 130.

The flow in cases where data is read out from the external volume 240 of the second storage device 200 will be described with reference to FIG. 9. First, the host 10 designates a communications port 111 and transmits a data read-out command to the first storage device 100 (S31). When the first storage device 100 receives a read command, the first storage device 100 produces a read command in order to read out the requested data from the second storage device 200.

The first storage device 100 transmits the produced read command to the second storage device 200 (S32). In accordance with the read command received from the first storage device 100, the second storage device 200 reads out the requested data from the disk drive 220, transmits this read-out data to the first storage device 100 (S33), and reports that read-out was normally completed (S35). As is shown in FIG. 9(b), the first storage device 100 stores the data received from the second storage device 200 in a specified location in the cache memory 130 (S34).

The first storage device 100 reads out the data stored in the cache memory 130, performs address conversion, transmits the data to the host 10 via the LUN 103 or the like (S36), and issues a read-out completion report (S37). In the series of processing performed in these data read-outs, the conversion operation described with reference to FIG. 6 is performed in reverse.

Figure 9A:
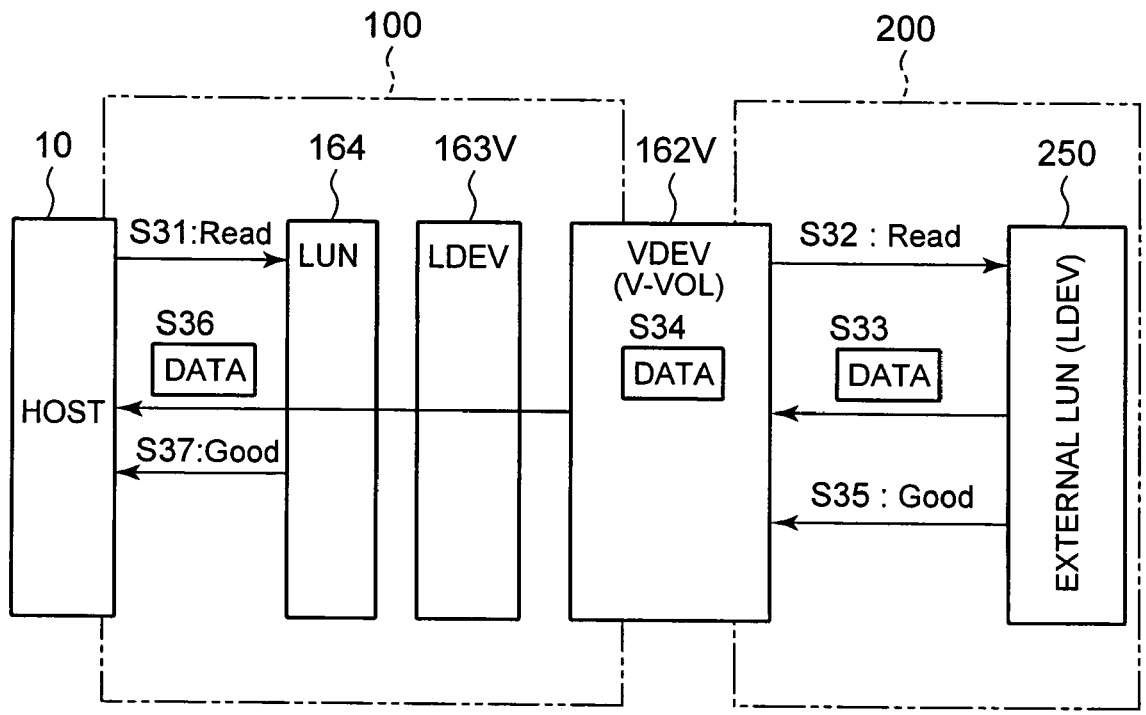
FIG. 9 is a schematic diagram showing a case in which data is read out from an external storage device used as a virtual volume.
Figure 9B:
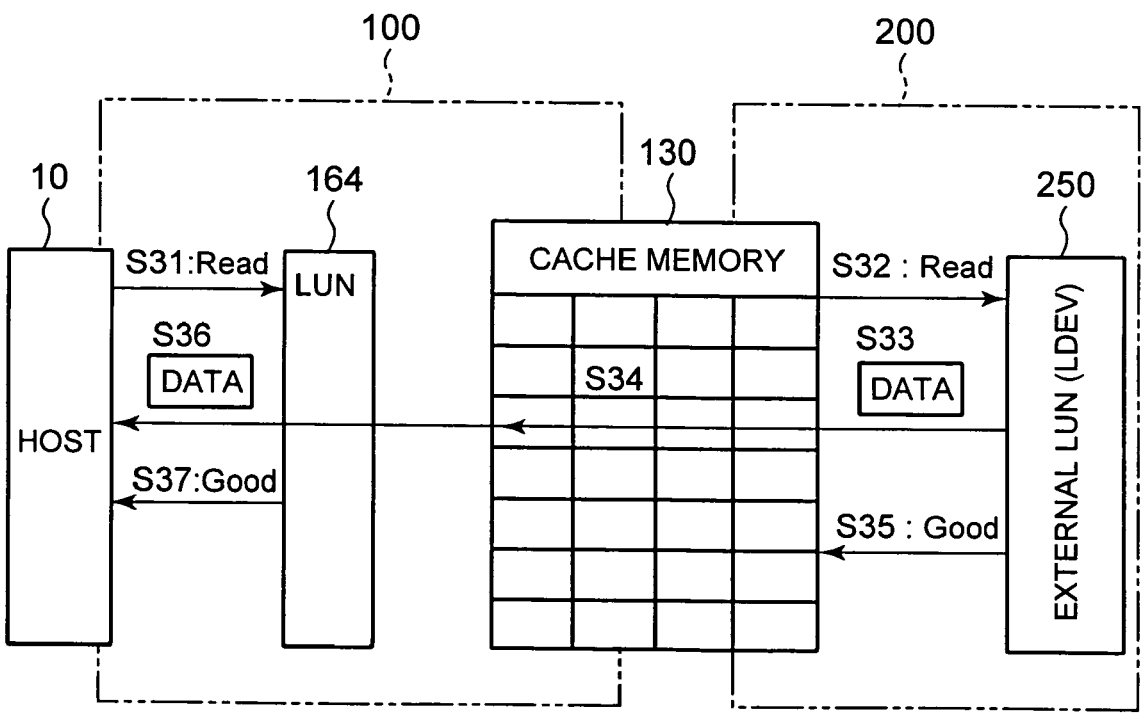

In FIG. 9, the operation is shown as if data is read out from the second storage device 200 and stored in the cache memory 130 in accordance with the request from the host 10. However, the operation is not limited to this; it would also be possible to store all or part of the data stored in the external volume 240 of the second storage device 200 in the cache memory 130 beforehand. In this case, in response to a command from the host 10, data can be immediately read out from the cache memory 130 and transmitted to the host 10.

Figure 10:
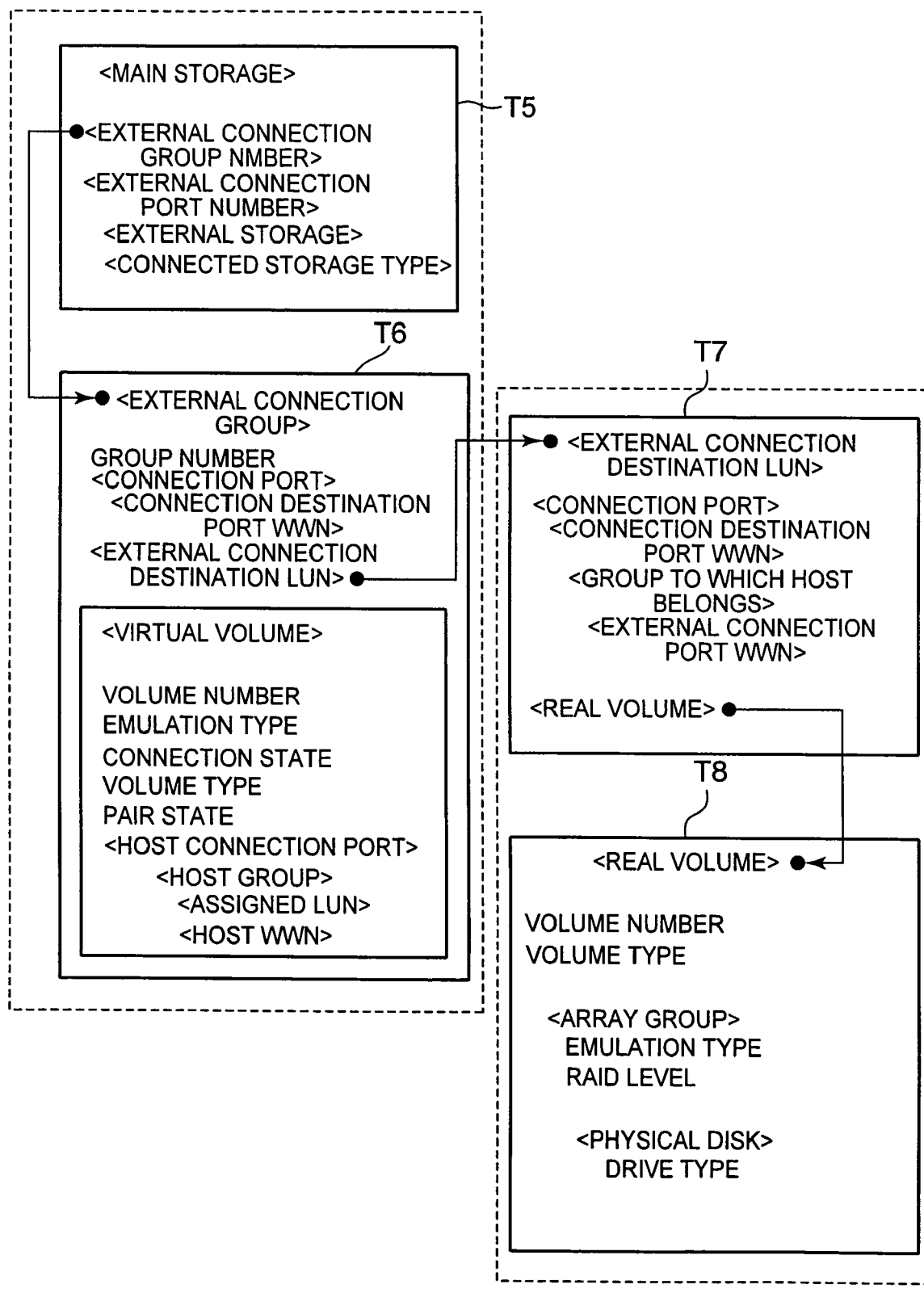
FIG. 10 is an explanatory diagram showing one example of the reserve information control table.

Next, FIG. 10 is an explanatory diagram which shows one example of the reserve information that is controlled by the reserve information control table Tr. For example, the reserve information can be constructed by forming a plurality of tables T5 through T8 into a hierarchy.

For example, the main storage control table T1 can be constructed so that this table includes the numbers of external connection groups, the numbers of the ports used for external connections, the type of external storage (second storage device) and the like. Here, the term "external connection" refers to the connection of an external storage device (second storage device 200) to the first storage device 100 which is the main storage device, so that the memory resources of the external storage device are incorporated. The external connection group numbers constitute discriminating information that is given in units of external connection groups. For example, a plurality of external connection groups (V-VOLs) can be set in a single main storage.

For example, external connection group tables T6 are provided for each external connection group number. The external connection groups correspond to V-VOLs 162V. For example, this table T6 can include external connection group numbers, WWN assigned to ports used for external connections, external connection destination LUNs (logical unit numbers), information for virtual volumes 163V and the like.

The information for the virtual volumes 163V may include (for example) volume numbers, emulation type, connection state, volume type, pair state, information relating to the host connection port used to provide the virtual volume to the host 10 and the like. For example, host connection port information may include the number of the host group to which the host belongs, the LUN assigned as the access destination of the host, the WWN of the host and the like.

The respective types of information recorded in the tables T5 and T6 described above are respectively acquired from the construction information Tc1 of the first storage device 100 which is the main storage.

Next, the tables T7 and T8 acquired from the construction information Tc2 of the second storage device 200 which is the external storage will be described. The external connection destination LUN table T7 is a table that is used to control the ports that are connected to the first storage device 100. For example, this table T7 can include the WWN assigned to the external connection port, information relating to real volume 240 that is assed to this external connection port, and the like.

For example, the real volume control table T8 can include the volume number, volume type, information relating to the disk array group and the like. For example, information relating to the disk array group may include the emulation type and RAID level set in the disk array group (also called a RAID group or parity group in some cases), information relating to the physical disks that constitute the disk array group and the like. For instance, the drive type may be cited as an example of information relating to the physical disk, i. e., disk drive 220.

Thus, a reserve information control table Tr such as that shown in FIG. 10 can be constructed on the basis of the construction information Tc1 and Tc2 of the respective storage devices 100 and 200. As was described above, this reserve information control table Tr may include information relating to the connection constructions between the virtual volumes 163V and real volumes 240 (mapping information), various states such as the copying pair states set for the virtual volumes 163V (the actual bodies are real volumes 240) and the like. Accordingly, by referring to this reserve information control table Tr, it is possible to ascertain whether or not the construction altering operation aimed at a real volume 240 has an effect on the connection construction with the virtual volume 163V.

FIGS. 11 through 13 are explanatory diagrams showing other examples of the reserve information control table Tr. The respective tables T9 through T11 shown in FIGS. 11 through 13 show the contents of the abovementioned tables T5 through T8 in more concrete terms.

The mapping table T9 can be produced on the basis of the construction information Tc1 that is controlled by the first storage device 100, or more specifically, on the basis of the mapping table T1 which is a portion of the construction information Tc1.

The mapping table T9 can be constructed by respectively associating storage discriminating information (ID) that is used to discriminate the main storage (the first storage device 100 in the present embodiment), the VDEV number that is used to discriminate the virtual intermediate device V-VOL that is set in this main storage, discriminating information for the external storage (second storage device 200 in the present embodiment) that is connected to this main storage, capacity and device type of the V-VOL (i. e., capacity and device type of the real volume), and path information for accessing the real volume. Furthermore, for example, the abovementioned path information may include the port number of the external storage, the WWN of the port, and the LUN that is connected to the port.

Accordingly, by referring to this mapping table T9, it is possible to grasp which virtual volume inside the main storage corresponds to which real volume of the external storage, which path can be used for access and the like.

FIG. 12 is an explanatory diagram which shows one example of the VDEV-LDEV-LUN-HOST control table T10 (hereafter referred to as the internal volume control table T10) that is used to provide volumes inside the main storage to the host. This internal volume control table T10 is not limited to virtual volumes 163V inside the main storage; real volumes 163 can also be simultaneously controlled. This internal volume control table T10 can be produced on the basis of the construction information Tc1 of the first storage device 100.

This internal volume control table T10 can be constructed by associating (for example) main storage discriminating information, the numbers of the respective VDEVs (including V-VOLs) disposed in this main storage, the numbers of the logical volumes (LDEVs) set in the VDEVs, the capacities of these volumes, the attributes of the volumes (emulation type and pair state), path information used to provide the volumes to the host 10 and the like.

Here, "pair state" among the volume attributes indicates the copying pair state set in the volume. The "normal" state indicates a state in which no copying pair is set for the volume. The "pair" state indicates a state in which a copying pair is set for the volume. More specifically, copying pair states include (for example) "pair form (paircreate)", "pair split (pairsplit)", "resynchronize (resync)" and the like. Here, the "pair form" status is a state in which initial copying (full copying) from the copying source volume to the copying destination volume has been performed, so that a copying pair is formed. The "pair split" status is a state in which the copying source volume and copying destination volume are separated after the copying pair has been forcibly synchronized. The "resynchronize" status is a state in which the storage contents of the copying source volume and copying destination volume are resynchronized and a copying pair is formed after the two volumes have been separated.

The path information in the internal volume control table 10 is path information indicating the path to the host utilizing the volume in question. For example, this path information can include the number of the target port to which the volume is connected, the number of the host group to which the host utilizing the volume is connected, the WWN of this target port, the LUN assigned to the volume and the like.

FIG. 13 is an explanatory diagram showing one example of the external volume control table T11 that is used to control the construction of the external volumes disposed in the external storage. This external volume control table T11 can be produced on the basis of the construction information Tc2 of the second storage device 200.

For example, the external volume control table T11 can be constructed by associating discriminating information that is used to discriminate the external storage, information for the respective disk array groups (disk array group number and RAID type) disposed in this external storage, numbers of volumes (LDEV) set in this disk array group, capacity and attributes of these volumes, path information used to connect these volumes to the main storage and the like.

Here, known RAID types include (for example) RAID 0 in which the storage regions of a plurality of disks are simply joined, RAID 1 (mirroring) in which the same data is respectively written into different disks, RAID 5 in which parity calculations for respective data are performed (as in the case of "3D+1P" or the like), and these respective data and parity values are distributed and stored in separate disks, and combinations of these RAID types (RAID 1+0 or the like).

Figure 14:
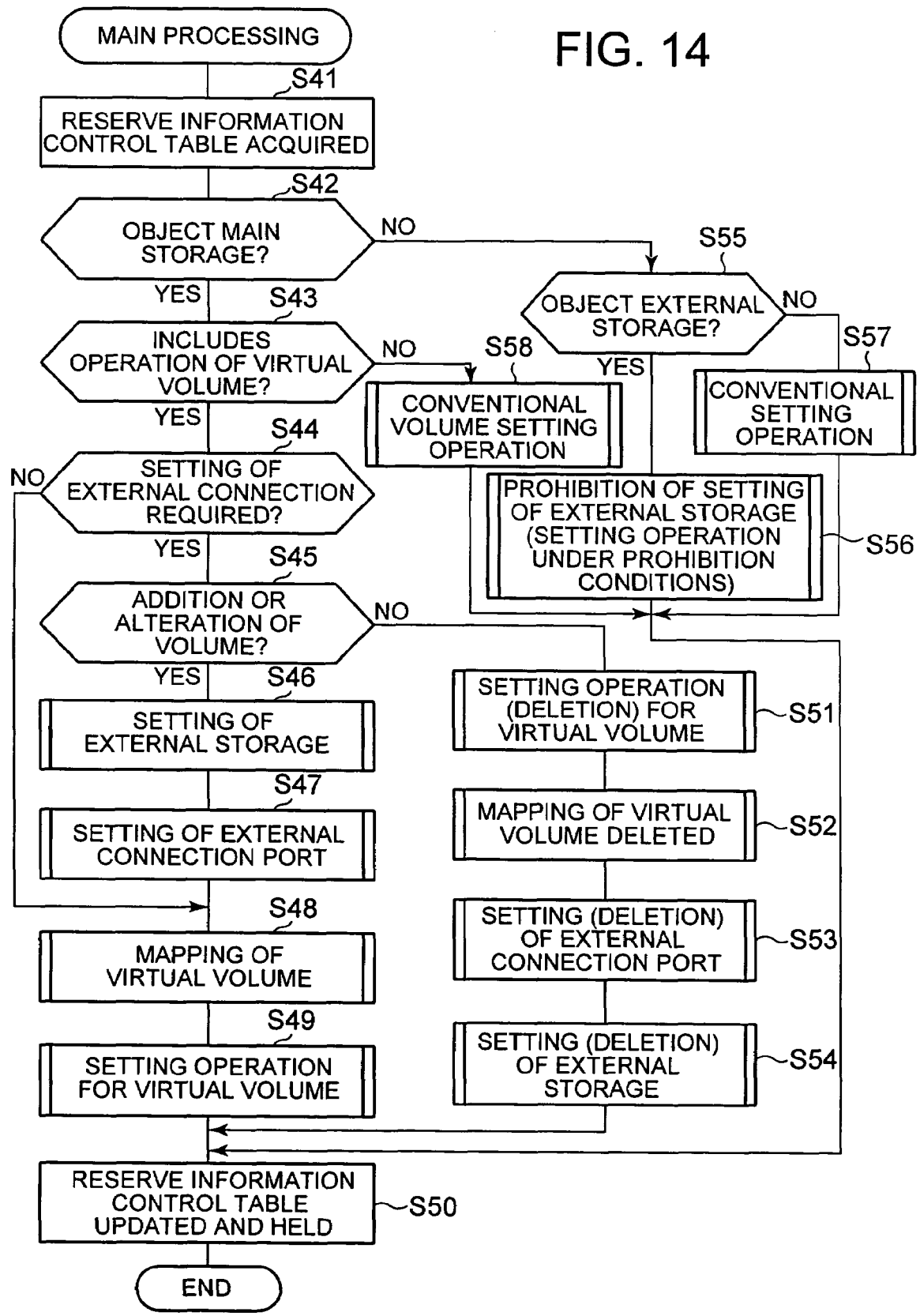
FIG. 14 us a flow chart showing the main processing.

Next, the operation of the storage system will be described with reference to FIGS. 14 through 22. FIG. 14 is a main flow chart which shows the overall operation of construction control. First, the overall operation of construction control will be described; next, the main sub-processing in the main processing will be described later with reference to separate figures.

For example, the user logs into the control server 20 via the control terminal 30, calls up a control screen, and inputs the desired construction altering operation. The main processing is executed when the user performs a construction altering operation.

First, the control server 20 acquires the reserve information control table Tr that is controlled by the repository 23 (S41). The method used to produce the reserve information control table Tr will be described later; however, this reserve information control table Tr can be produced when discovery processing is executed for the first storage device 100.

On the basis of the construction altering operation that is input by the user, the control server 20 judges whether or not the storage that is the object of this operation is the main storage (S42). In cases where the user desires to alter the construction of the main storage (S42: YES), the control server 20 judges whether or not an operation of the virtual volume 163V (production or deletion) is contained in the construction altering operation desired by the user (S43).

In cases where an operation of the virtual volume 163V is contained (S43: YES), the control server 20 judges whether or not the setting of an external connection is required (S44). Specifically, the control server 20 judges whether or not to alter the setting of the access path that connects the virtual volume 163V that is the object of the operation and the real volume 240 that is associated with this virtual volume 163V.

In cases where the setting of an external connection is required (S44: YES), the control server 20 judges whether or not the addition or alteration of volumes is necessary (S45). In cases where the addition or alteration of volumes is necessary (S45: YES), the control server 20 respectively executes external storage setting processing (S46), external connection port setting processing (S47), virtual volume mapping processing (S48), and setting operation processing for the virtual volume (S49), and updates and holds the reserve information control table Tr (S50). Furthermore, in cases where the setting of an external connection is not necessary (S44: NO), the control server 20 skips S45 through S47, and proceeds to S48.

The abovementioned sub-processing S46 through S49 will be further described later. Details of the external storage setting processing will be described with reference to FIGS. 15 and 16. Details of the external connection port setting processing will be described with reference to FIG. 17. Details of the virtual volume mapping processing will be described with reference to FIG. 18. Details of the setting operation processing for the virtual volume will be described with reference to FIGS. 19 and 20.

On the other hand, cases where the construction altering operation requested by the user does not involve the addition or alteration of volumes (S45: NO) are cases in which the cancellation of cooperation between the virtual volume 163V and real volume 240 is requested by the user.

Accordingly, the control server 20 deletes the virtual volume 163V designated by the user (S51), and deletes the mapping setting between the deleted virtual volume 163V and real volume 240 (S52). Next, the control server 20 deletes the setting of the external connection port associated with the deleted virtual volume 163V (S53), and deletes the setting of the external storage associated with the deleted virtual volume 163V (S54).

In cases where the storage that is the object of the construction altering operation requested by the user is not the main storage (S42: NO), the control server 20 judges whether or not the object storage is an external storage (S55).

In cases where the storage that is the object of the construction altering operation is an external storage (S55: YES), the control server 20 performs setting prohibition processing for the external storage (S56). The details of this setting prohibition processing for the external storage will be described with reference to FIG. 21; however, construction alteration is permitted within a range that has no effect on the cooperation of the virtual volume 163V and real volume 240.

Cases in which the storage that is the object of the construction altering operation is not an external storage, either (S55: NO), are cases in which an ordinary construction altering operation is required for a storage device that is not used for external connections; accordingly, the control server 20 performs a conventional setting operation (S57). Specifically, examples of such ordinary setting operations that are not associated with external connections include the creation and deletion of volumes, assignment of ports, unification of volumes, LUN mapping and the like.

On the other hand, cases where the object of the construction altering operation desired by the user is the main storage (S42: YES), and where no operation of the virtual volume 163V is included (S43: NO), are cases in which a real volume 163 is produced or deleted inside the main storage. Accordingly, the control server 20 performs a conventional volume setting operation (S58).

In cases where the construction of the storage system is altered in S56 through S58, these construction alterations are held and reflected in the reserve information control table Tr (S50). Accordingly, in the reserve information control table Tr, occasional updating is performed on the basis of the contents of the respective construction alterations executed via the control server 20, so that the most recent information can be held.

The external storage setting processing will be described with reference to FIGS. 15 and 16. This processing corresponds to S46 in the main processing. First, the control server 20 makes a confirmatory judgment as to whether or not the setting of an external storage has been requested (S61). In cases where the setting of an external storage has not been requested, the processing returns to the main processing shown in FIG. 14.

In cases where the setting of an external storage has been requested (S61: YES), the control server 20 judges whether or not the external storage requested by the construction alteration is an external storage placed under its own control (S62). In cases where a construction alteration for an external storage other than an external storage that is the object of control of the control server 20 is requested (S62: NO), the control server 20 notifies the control terminal 30 of an error (S63).

In cases where a construction alteration for an external storage that is under the control of the control server 20 is requested (S62: YES), the control server 20 judges whether or not the creation of a volume has been instructed by the user (S64). In cases where the creation of a volume has been instructed (S64: YES), the control server 20 (for example) produces a volume inside the external storage by sending a request to the controller 210 of the second storage device 200 (S65). In cases where a volume cannot be created in the external storage (S66: NO), the control server 20 notifies the control terminal 30 of an error (S67).

In cases where a volume is created (S66: YES), the control server 20 judges whether or not the setting of LUN mapping is instructed (S68). LUN mapping refers to processing that associates a volume (LUN) with a port. In cases where LUN mapping is instructed (S68: YES), an inspection of prohibition conditions is performed (S69). Inspection processing of prohibition conditions will be described later with reference to FIG. 16; however, in this inspection processing, a judgment is made as to whether or not the assignment of the volume produced in S65 to a port is permitted.

In cases where the result of inspection is "not possible", i. e., in cases where "FALSE" is set in the inspection flag described later (S70: NO), the control server 20 notifies the control terminal 30 of an error (S71). Conversely, in cases where the inspection result is "possible", i. e., in cases where "TRUE" is set in the inspection flag (S70: YES), the control server 20 assigns a LUN to the communications port that is the object of the construction alteration (S72), and judges whether or not the assignment of a LUN has been successful (S73).

In cases where the assignment of a LUN to the port has failed (S73: NO), the control server 20 notifies the control terminal 30 of an error (S74). In cases where the assignment of a LUN to the port is successful (S73: YES), the control server 20 updates and holds the reserve information control table Tr (S75). When this processing is completed, the processing returns to the main processing.

Figure 15:
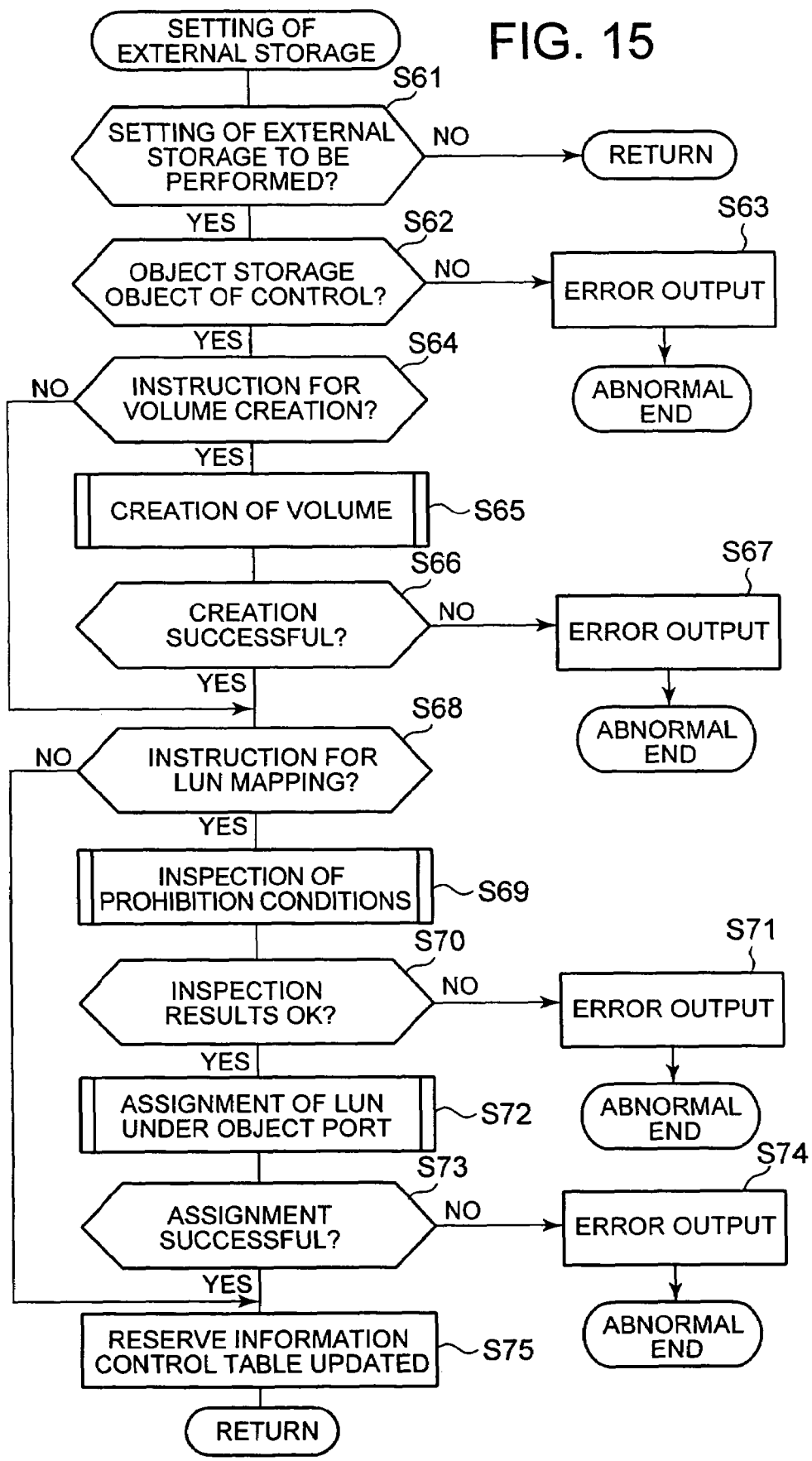
FIG. 15 is a flow chart showing the external storage setting processing.
Figure 16:
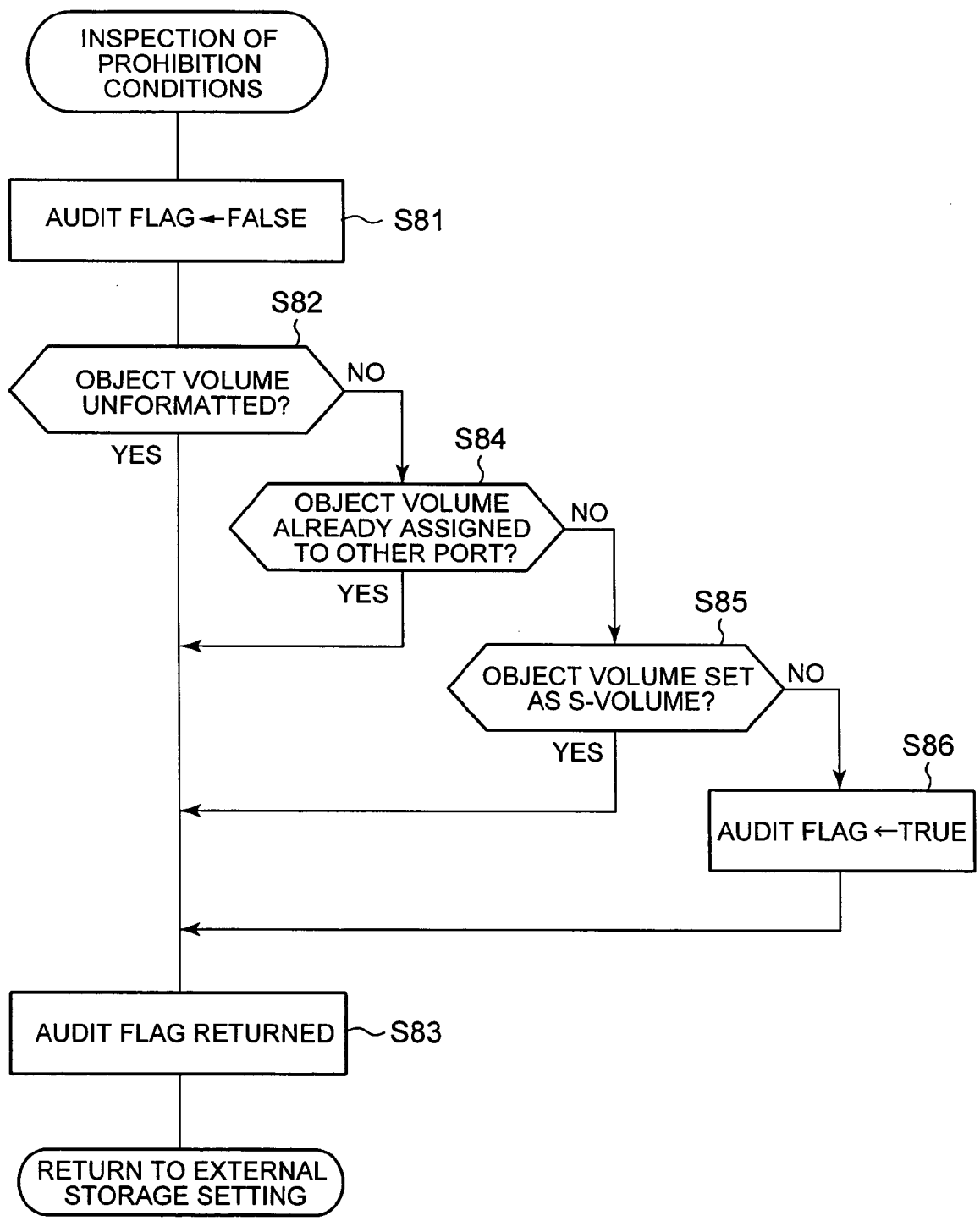
FIG. 16 is a flow chart showing the monitoring processing of the prohibition conditions.

FIG. 16 is a flow chart which shows the inspection processing of the prohibition conditions indicated as S69 in FIG. 15. First, the control server 20 sets "FALSE" in the inspection flag (audit flag) (S81). An inspection is made for a plurality of prohibition conditions (described below). Then, only in cases where all of the prohibition conditions are cleared, "TRUE" is set in the inspection flag, and the processing returns to the external storage setting processing shown in FIG. 15.

First, the control server 20 judges whether or not the object volume is unformatted (S82). In cases where the volume is unformatted (S82: YES), the volume cannot be used in assignment to an external connection port. Accordingly, the control server 20 does not alter the content of the inspection flag, but returns to the flow chart in FIG. 15 with the "FALSE" value left as is (S82).

On the other hand, in cases where the object volume of LUN mapping is formatted (S82: NO), the control server 20 judges whether or not the object volume has already been assigned to another port (S84). In cases where the object volume has already been assigned to another port (S84: YES), this indicates a case in which the volume is being used in another application; accordingly, the processing returns to the flow chart shown in FIG. 15 with the value of the inspection flag remaining as "FALSE" (S83).

In cases where the object volume has not been assigned to another port (S84: NO), the control server 20 judges whether or not this object volume has been set as a copying destination volume (S-VOL) (S85). In cases where the volume that is the object of LUN mapping has been set as a copying destination volume (S85: YES), the storage contents of this volume are caused to coincide with the contents of the copying source volume (P-VOL). Accordingly, when the volume set as the copying destination is mapped into the virtual volume of the main storage, there is a possibility that the storage contents will not coincide with the storage contents of the virtual volume. Accordingly, in this case (S85: YES), the control server 20 returns to the flow chart shown in FIG. 15 with the value of the inspection flag still set as "FALSE" (S83).

In cases where the object volume is not set as a copying destination volume (S85: NO), this indicates a case in which this volume is assigned to an external connection port of the external storage, and can be used in association with a virtual volume of the main storage. Accordingly, the control server 20 alters the value of the inspection flag to "TRUE (S86), and returns to the flow chart shown in FIG. 15 (S83).

Figure 17:
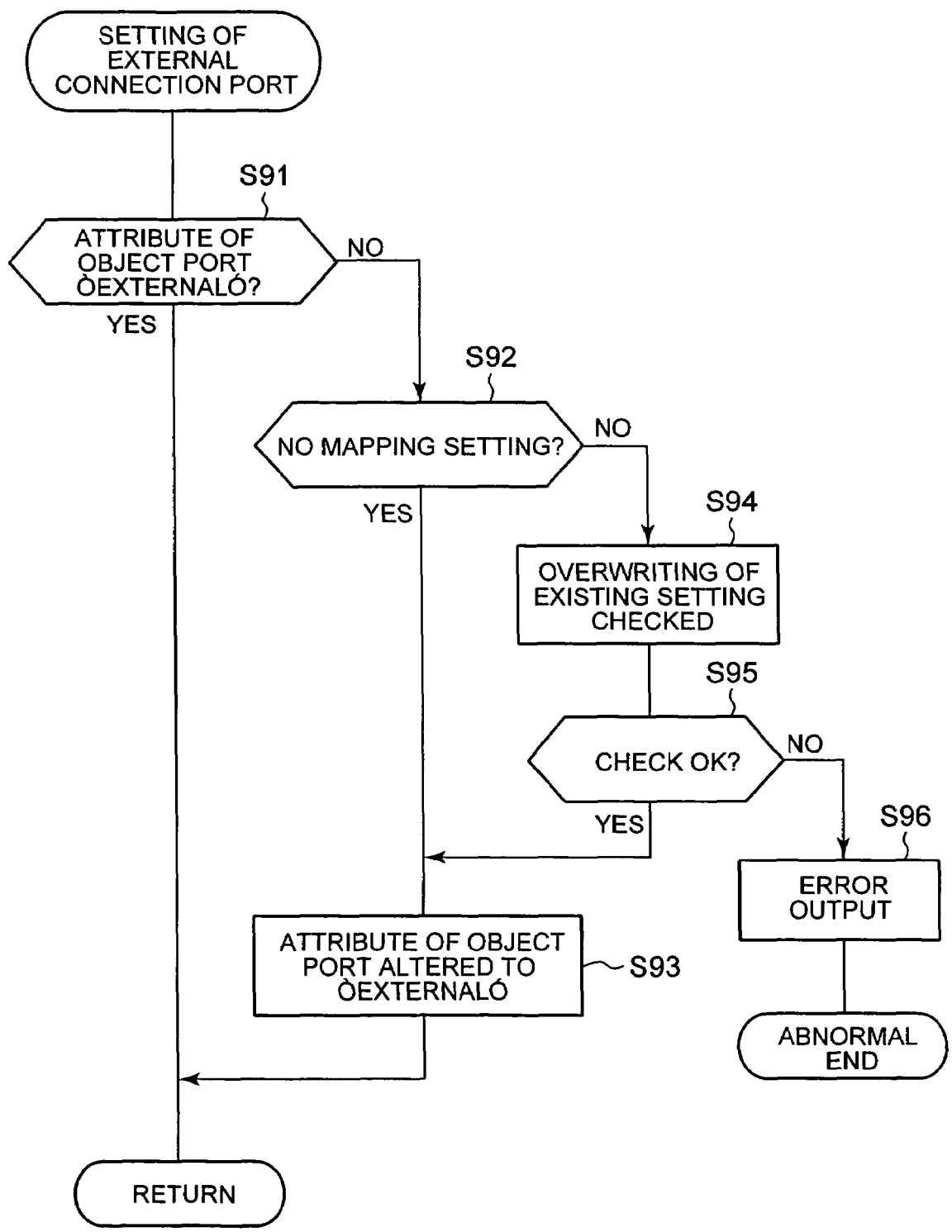
FIG. 17 is a flow chart showing the external connection port setting processing.

FIG. 17 is a flow chart which shows the setting processing of the external connection port described in S47 in FIG. 14. First, the control server 20 investigates the attribute of the port that is the object of the construction altering operation, and judges whether or not the attribute of this port is "external", i. e, whether or not this object port is a port used for external connections (S91). In cases where the attribute of the object port is "external", this indicates a case in which this port can be used "as is" as a port for external connections; accordingly, the control server 20 completes this processing, and returns to the main processing shown in FIG. 14.

In cases where the attribute of the object port is not set as "external" (S91: NO), the control server 20 judges whether or not mapping has not already been set for the object port (S92). In cases where mapping has not yet been set for this object port (S92: YES), this object port is usable; accordingly, the control server 20 alters the attribute of this unused port to "external" (S93), and ends this processing.

In cases where mapping has already been set for the object port (S92: NO), the control server 20 sends an inquiry to the control terminal 30 as to whether or not the existing mapping setting can be overwritten (S94), and waits for the approval of overwriting by the user (S95). Then, in cases where the user gives approval for overwriting of the existing setting (S95: YES), the control server 20 alters the attribute of the object port to "external" (S93), and ends this processing. On the other hand, in cases where the user does not give approval for the overwriting of the mapping already set for the object port (S95: NO), the virtual volume and real volume cannot be connected using this object port; accordingly, the control server 20 notifies the control terminal 30 of an error (S96).

Figure 18:
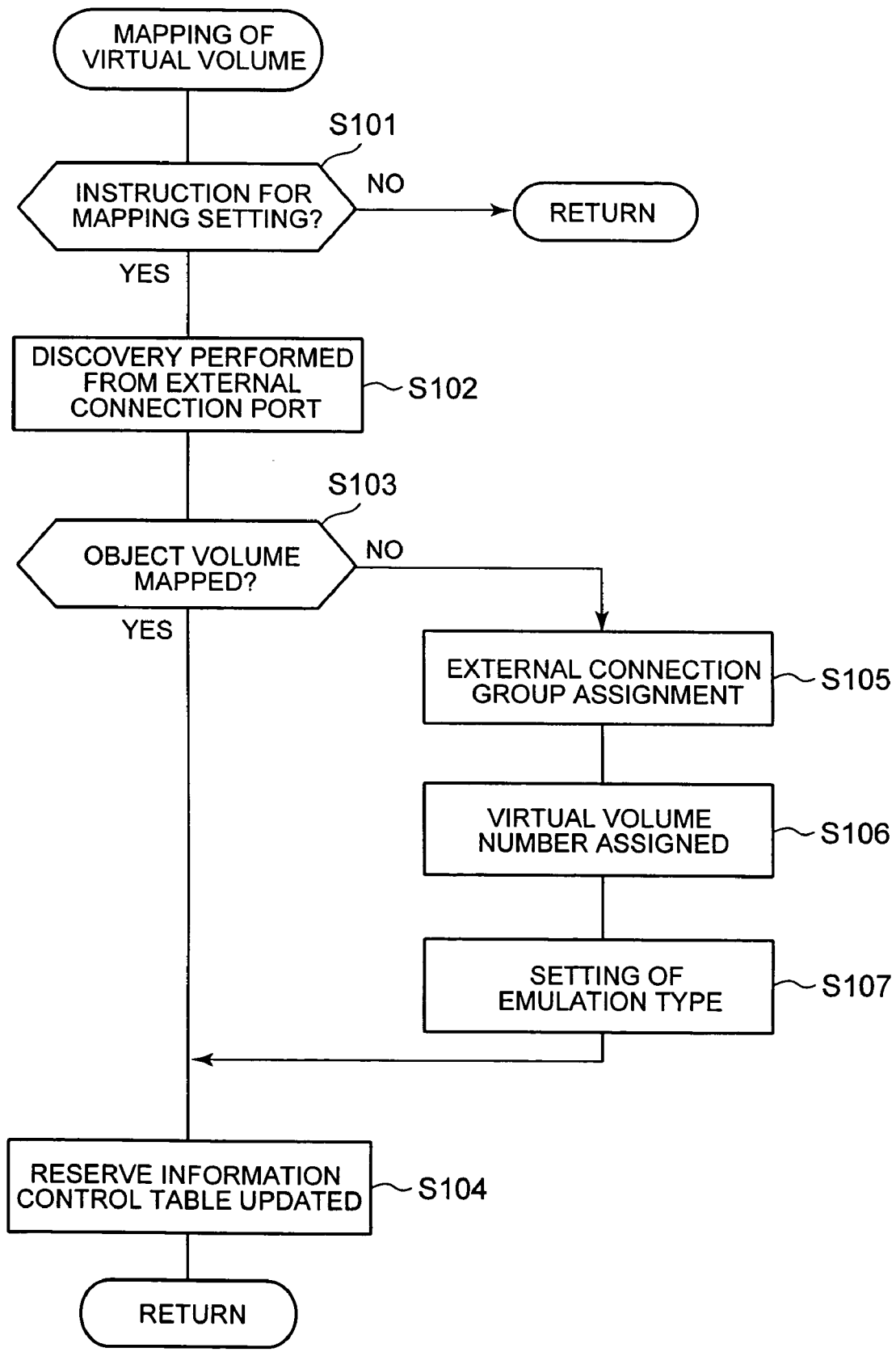
FIG. 18 is a flow chart showing the mapping processing of a virtual volume.

FIG. 18 is a flow chart which shows the mapping processing of the virtual volume described in S48 in FIG. 14. First, the control server 20 checks in order to ascertain whether or not mapping processing of the virtual volume is to be performed (S101). In cases where mapping processing of the virtual volume is not to be performed (S101: NO), the control server 20 ends this processing, and returns to the main processing shown in FIG. 14.

In cases where mapping processing of the virtual volume is to be started (S101: YES), the control server 20 executes discovery processing from the external connection port (S102). In this discovery processing, the volume connected to the external connection port is discovered.

The control server 20 judges whether or not the discovered volume has already been mapped (S103). In cases where this volume has already been mapped (S103: YES), the control server 20 updates the reserve information control table Tr (S104), and returns to the main processing shown in FIG. 14.

In cases where the discovered volume has not yet been mapped (S103: NO), the control server 20 assigns an external connection group number to this volume (S105). Furthermore, a virtual volume number is assigned to this volume (S106). Moreover, the control server 20 sets an emulation type for this volume (S107). The control server 20 updates the reserve information control table Tr (S104), and returns to the main processing shown in FIG. 14.

Figure 19:
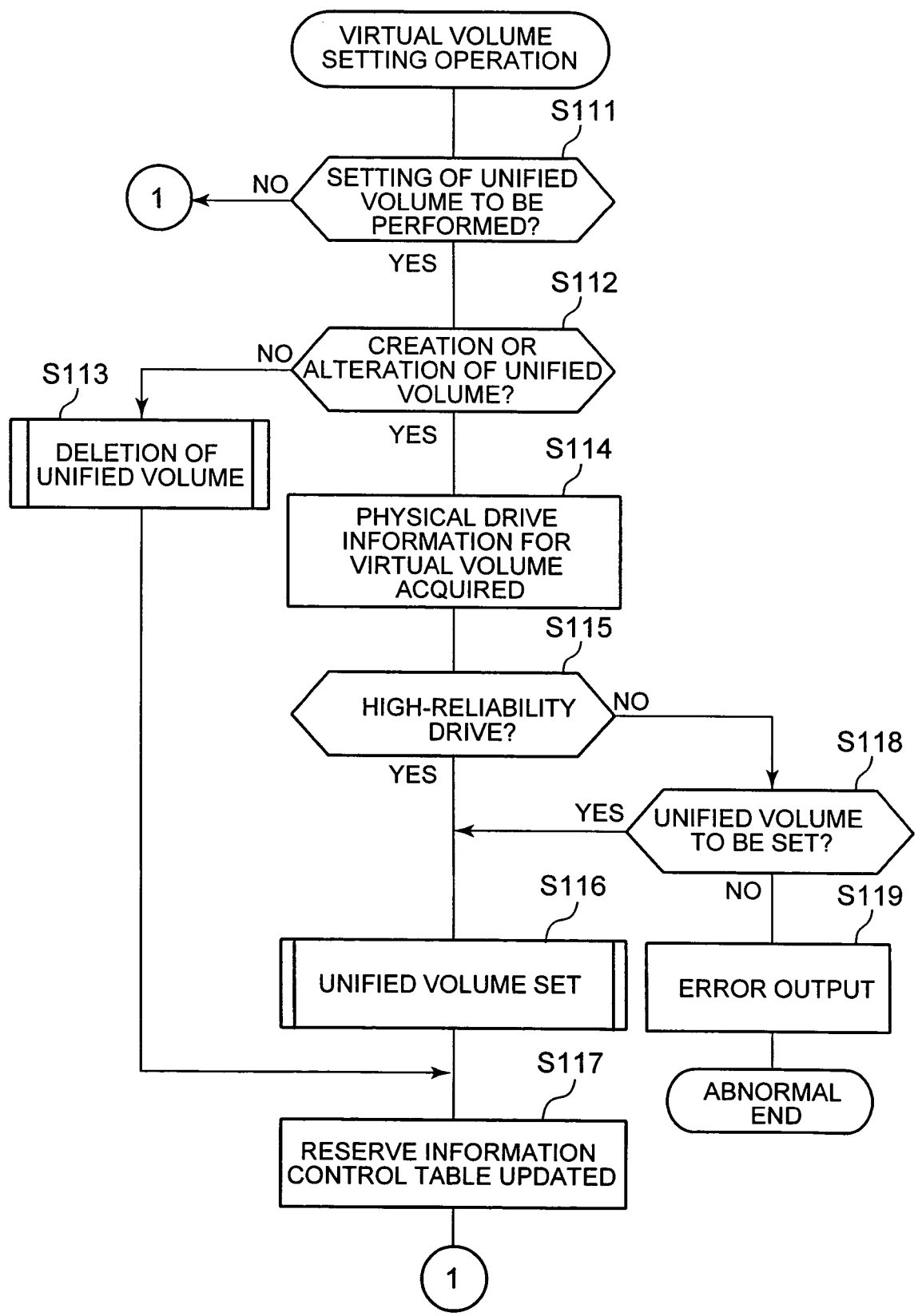
FIG. 19 is a flow chart showing the virtual volume setting operation processing.
Figure 20:
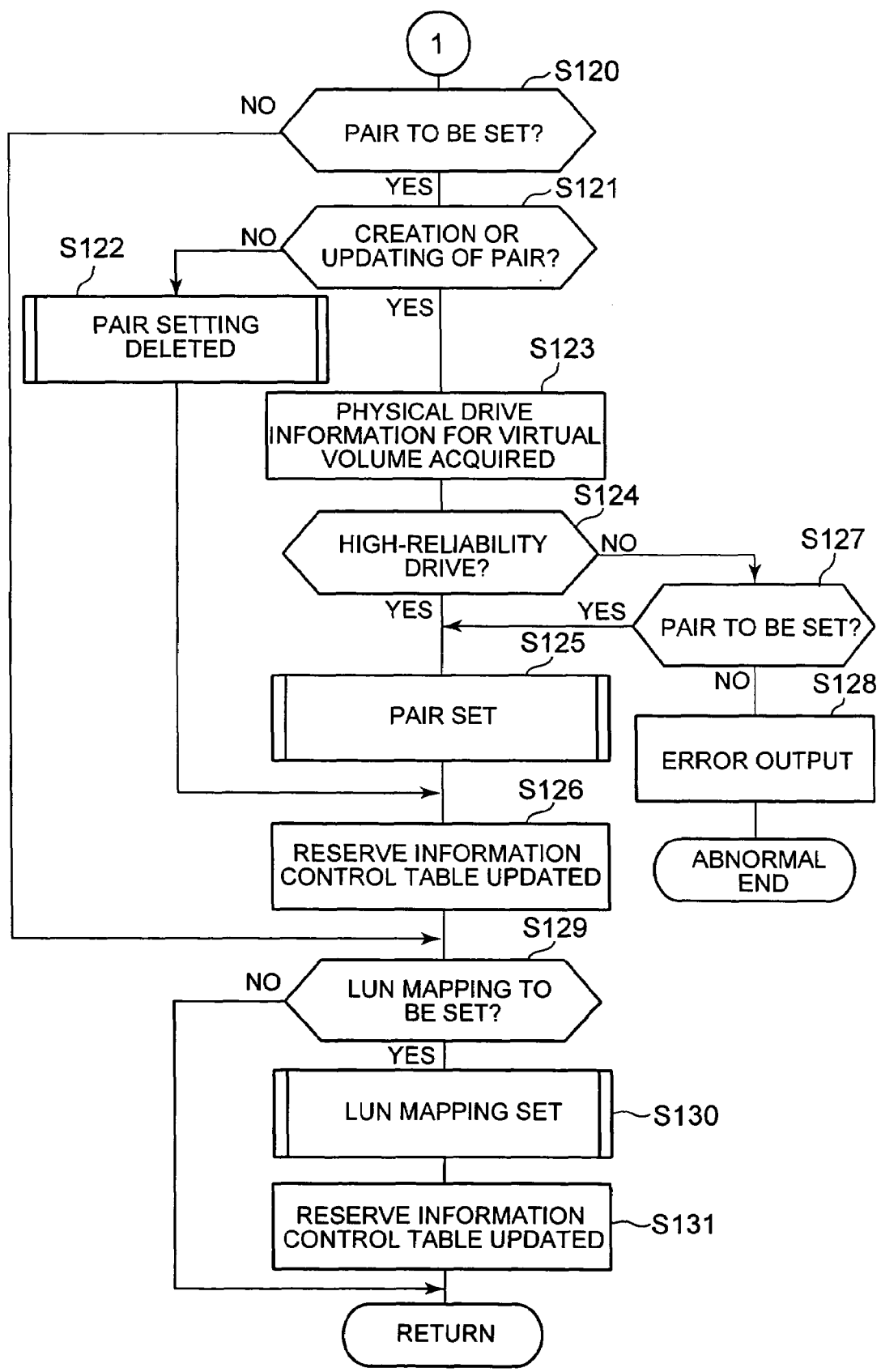
FIG. 20 is a flow chart that is a continuation of FIG. 19.

FIGS. 19 and 20 are flow charts which show the setting operation processing for the virtual volume described in S49 in FIG. 14. First, the control server 20 judges whether or not the setting of a unified volume is to be performed (S111).

The setting of a unified volume refers to processing that expands the volume size by assigning a plurality of volumes to a single port (processing that reduces the apparent number of LUNs). Specifically, the formation of a single large-capacity volume is recognized by the host 10. Accordingly, when a unified volume is set in a virtual volume, the size of this virtual volume is the total of the respective sizes of the unified plurality of real volumes, thus producing a large capacity. In cases where the setting of a unified volume is not to be performed (S111: NO), the processing shifts to the processing shown in FIG. 20 via a link.

In cases where the setting of a unified volume is to be performed (S111: YES), the control server 20 judges whether or not the creation or updating of a unified volume is to be performed (S112). In cases where neither the creation nor updating of a unified volume is to be performed (S112: NO), i. e., in cases where the deletion of a unified volume is requested, the control server 20 cancels the unified volume (S113).

In cases where the creation or updating of a unified volume is requested (S112: YES), the control server 20 acquires information relating to the physical drive associated with the virtual volume (this is a disk drive 220 of the second storage device 200 in the present embodiment) from the reserve information control table Tr (S114).

The control server 20 judges whether or not the physical disk on which the virtual volume is based is a high-reliability drive (S115). For example, the term high-reliability drive refers to a drive that can be stably used over a long period of time, such as an FC (fiber channel) drive. In cases where this physical drive is a high-reliability drive (S115: YES), the control server 20 sets a unified volume (S116). After setting this unified volume, the control server 20 updates the reserve information control table Tr, and shifts to the processing shown in FIG. 20.

On the other hand, for example, in cases where the physical drive is not a high-reliability drive (as in the case of an SATA disk or the like) (S115: NO), the control server 20 sends an inquiry to the user as to whether or not a unified volume is to be set using this physical drive (S118). For example, this inquiry can be performed via the terminal screen of the control terminal 30. In cases where the user permits the production of a unified volume using a physical drive that does not possess such high reliability (S118: YES), the control server 20 performs the setting of a unified volume (S116), updates the reserve information control table Tr (S117), and shifts to the processing shown in FIG. 20. In cases where the user rejects the setting of a unified volume using a physical drive that does not possess high reliability (S118: NO), the control server 20 notifies the control terminal 30 of an error (S119).

Thus, in the present processing, when a unified volume is set, this unified volume is preferentially produced in a high-reliability storage region. Furthermore, even in the case of a storage region that does not possess high reliability, a unified volume is produced if the user give approval.

FIG. 20 is a flow chart which is a continuation of FIG. 19. Next, the control server 20 judges whether or not a copying pair is to be set (S120). In cases where a copying pair is not to be set (S120: NO), the processing shifts to S129 described later. In cases where a copying pair is to e set (S120: YES), the control server 20 judges whether or not the creation or updating of a copying pair has been requested (S121).

In cases where neither the creation nor updating of a copying pair has been requested (S121: NO), this indicates a case in which the cancellation of a copying pair has been requested. Accordingly, the control server 20 cancels the setting for the requested copying pair (S122).

On the other hand, in cases where the setting of a copying pair has been requested (S121: YES), the control server 20 acquires information relating to the physical drive mapped in the virtual volume from the reserve information control table Tr (S123), and judges whether or not this drive is a high-reliability drive (S124). In cases where this drive is a high-reliability drive such as an FC disk or the like (F124: YES), the control server 20 sets a copying pair (S125), and updates the reserve information control table Tr (S126).

On the other hand, for example, in cases where the physical drive is a drive that does not possess high reliability, such as an SATA disk or the like (S124: NO), the control server 20 sends an inquiry to the user (via the control terminal 30) as to whether or not it is permissible to set a copying pair using this physical drive (S127). In cases where the user gives approval (S127: YES), the control server 20 sets a copying pair (S125), and updates the reserve information control table Tr (S126). In cases where the user does not give approval (S127: NO), the control server 20 notifies the control terminal 30 of an error (S128).

Next, the control server 20 judges whether or not the setting of LUN mapping has been requested (S129). In cases where LUN mapping has been requested (S129: YES), the control server 20 performs the setting of LUN mapping (S130), updates the reserve information control table Tr (S131), and returns to the main processing shown in FIG. 14. In cases where the setting of LUN mapping is not to be performed (S129: NO), the control server 20 ends this processing, and returns to the main processing shown in FIG. 14.

Figure 21:
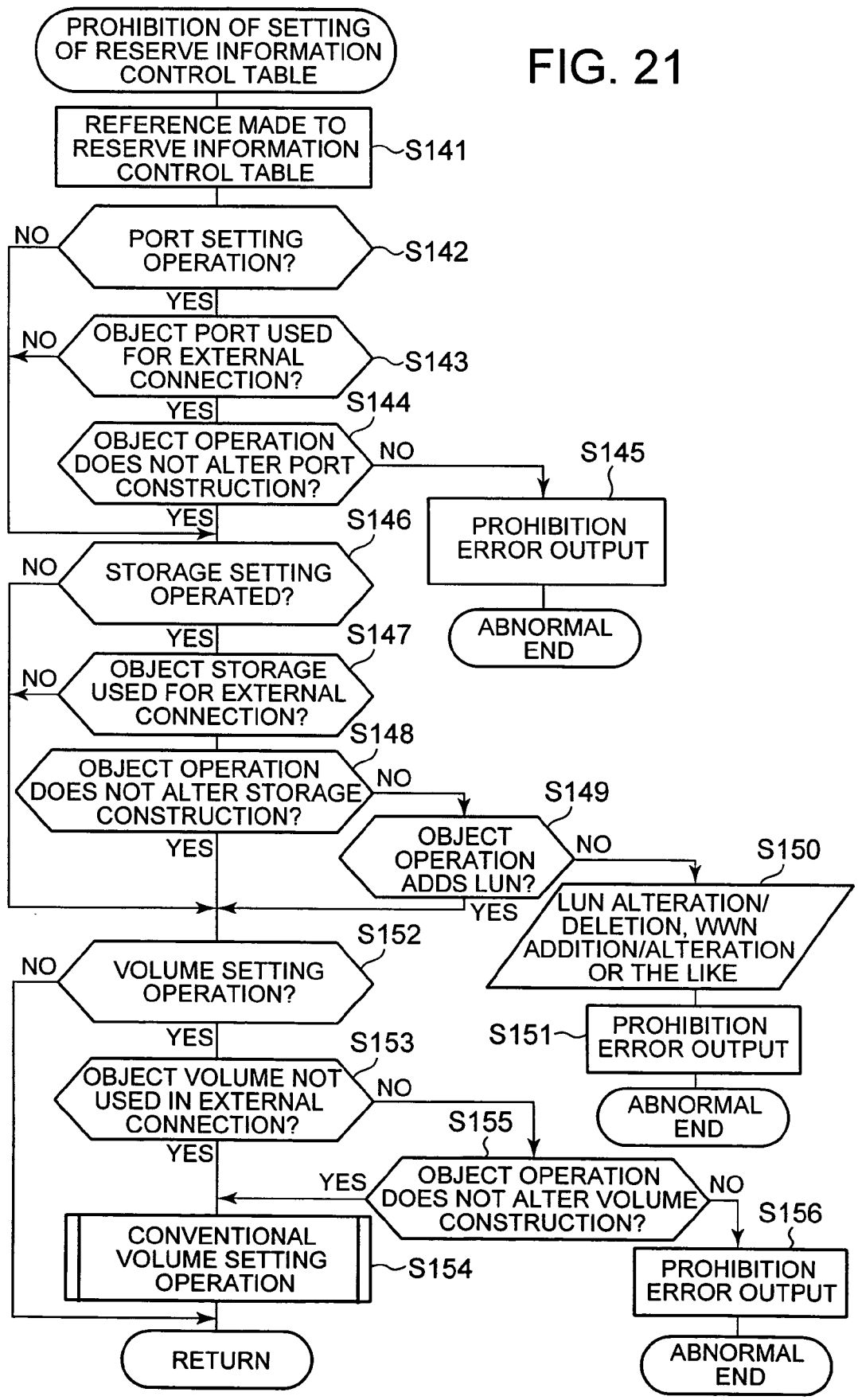
FIG. 21 is a flow chart showing the external storage setting prohibition processing.

Next, FIG. 21 is a flow chart which shows the setting prohibition processing for the external storage described in S56 in FIG. 14. As will be described below, this processing judges whether or not the construction altering operation for the external storage clears specified prohibition conditions, and allows the construction altering operation to be performed only in cases where all of the prohibition conditions are cleared.

First, the control server 20 acquires the reserve information control table Tr in order to judge the permissibility of the construction altering operation with respect to the external storage (S141). Next, the control server 20 judges whether or not a communications port setting operation (setting alteration) has been requested (S142). In cases where a port setting operation is to be performed (S142: YES), the control server 20 judges whether or not the port that is the object of the construction altering operation is being used for an external connection (S143). In cases where this port is being used for an external connection (S143: YES), the control server 20 judges whether or not the construction altering operation requested by the user causes no alteration of the construction of this port (S144).

In cases where the construction altering operation requested by the user alters the construction of the port (S144: NO), the control server 20 notifies the control terminal 30 that this operation is an operation that violates the prohibition conditions (S145). In cases where the requested construction altering operation does not alter the construction of the port (S144: YES), the processing shifts to S146. Furthermore, in cases where a judgment of "NO" is obtained in either of the abovementioned steps S142 or S143, the processing immediately shifts to S146.

Next, the control server 20 judges whether or not an external storage setting operation has been requested by the user (S146). In cases where an external storage setting operation has been requested (S146: YES), the control server 20 judges whether or not the external storage that is the object of the operation is being used for an external connection (S147).

In cases where the external storage is being used for an external connection (S147: YES), the control server 20 judges whether or not the construction altering operation requested by the user causes no alteration of the construction of the external storage (S148). In cases where the requested construction altering operation causes an alteration of the construction of the external storage (S148: NO), the control server 20 judges whether or not this operation is an operation that adds an LUN (S149).

In cases where this operation is not an operation that adds an LUN (S149: NO), this indicates that the construction altering operation requested by the user is an operation that alters or deletes an LUN, or an operation that adds or alters a WWN (S150); accordingly, the control server 20 notifies the control terminal 30 that this operation is an operation that violates the prohibition conditions (S151).

On the other hand, in cases where the operation requested by the user does not alter the construction of the external storage (S148: YES), or in cases where the requested operation is an operation that adds an LUN (S149: YES), the control server 20 shifts to the judgment of the next prohibition condition. Furthermore, in cases where a judgment of "NO" is obtained in either of the abovementioned steps S146 or S147, the processing immediately shifts to S152.

Next, the control server 20 judges whether or not a volume setting operation has been requested (S152). In cases where a volume setting operation has been requested (S152: YES), the control server 20 judges whether or not the volume that is the object of the operation is not being used for an external connection (S153). In cases where this volume is not being used for an external connection (S153: YES), i. e., in cases where the volume has not been mapped into a virtual volume of the main storage, this has no effect on the volume cooperation between the main storage and external storage; accordingly, the operation on this volume is performed (S154).

On the other hand, in cases where the volume that is the object of the operation is being used for an external connection (S153: NO), the control server 20 judges whether or not the requested operation does not alter the construction of this volume (S155). In cases where the construction altering operation requested by the user does not alter the construction of the externally connected volume (S155: YES), the control server 20 allows the operation requested by the user to be performed on the volume (S154).

On the other hand, in cases where the operation requested by the user is an operation that alters the construction of the externally connected volume (S155: NO), the control server 20 notifies the control terminal 30 that the requested operation is an operation that violates the prohibition conditions (S156).

Thus, in the processing described above, in cases where an operation on the external storage has an effect on the cooperation with the main storage, the performance of this operation is rejected, and notification of an error is issued, while in cases where the requested operation does not have an effect on cooperation with the main storage, the content of the operation is realized.

Figure 22:
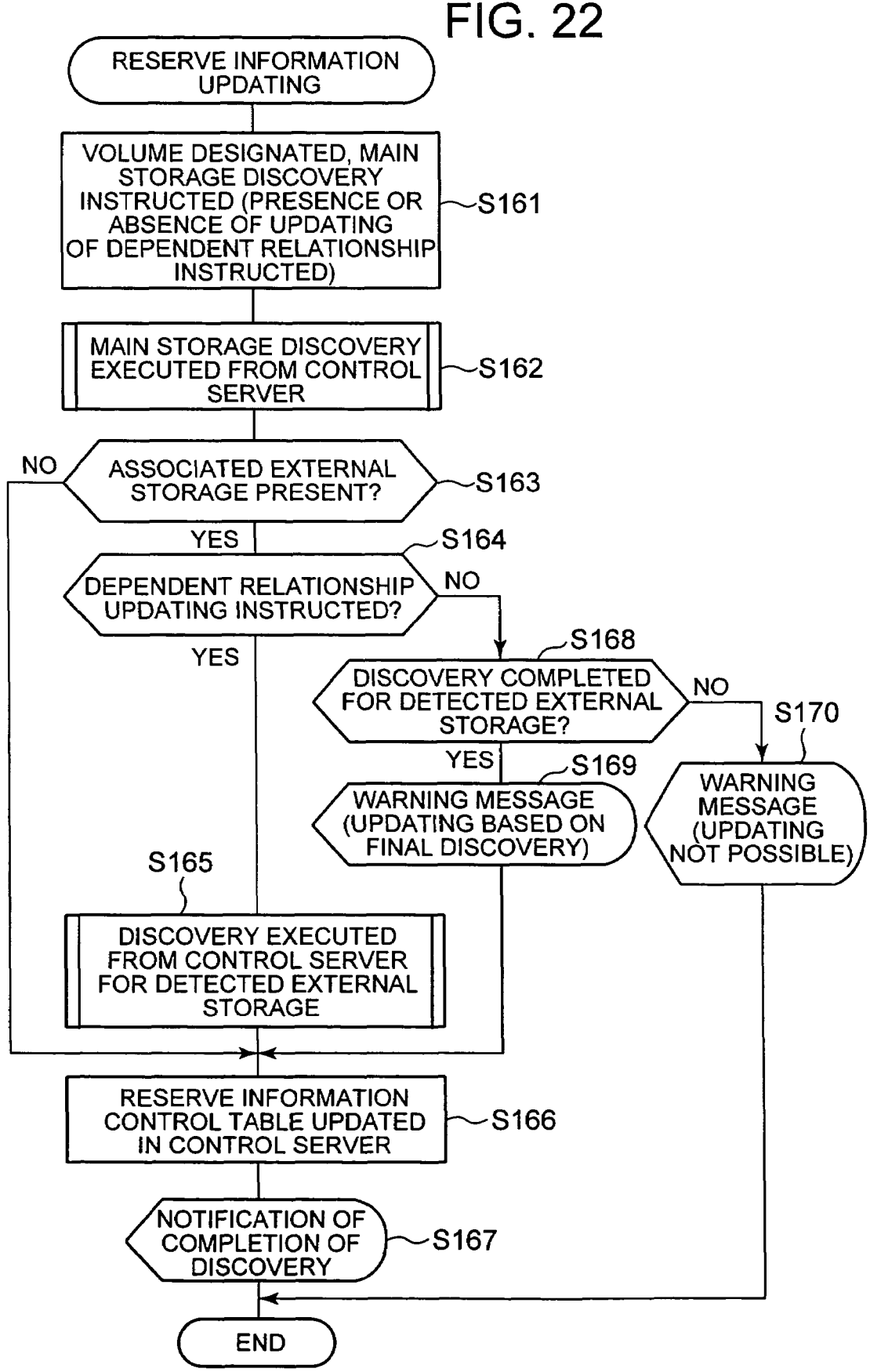
FIG. 22 is a flow chart showing the reserve information updating processing.

FIG. 22 is a flow chart which shows the updating processing of the reserve information control table Tr. As one example, the reserve information control table Tr can be updated when the user starts the execution of discovery processing.

The user logs into the control server 20 via the control terminal 30, designates the volume number, and gives instructions for the discovery of the main storage (S161). In this case, the user may also indicate whether or not updating of the dependence relationship between storages is to be performed.

When the execution of discovery processing is requested by the user, the control server 20 starts the discovery processing (S162). Furthermore, as a result of the execution of discovery processing, the control server 20 judges whether or not an external storage associated with the main storage has been detected (S163).

In cases where there is an external storage associated with the main storage (S163: YES), i. e., in cases where there is another storage that is externally connected to the main storage, the control server 20 judges whether or not updating of the dependence relationship has been requested by the user (S164).

In cases where the user has requested updating of the dependence relationship in S161 (S164: YES), the control server 20 executes discovery processing for the external storage discovered by the discovery processing (S165). The construction of the external storage can be acquired by this discovery processing. Then, the control server 20 registers the acquired construction information in the reserve information control table Tr and updates this table (S166); the control server 20 then notifies the control terminal 30 of the completion of discovery (S167).

On the other hand, in cases where the user has not requested updating of the dependence relationship between the storages (S164: NO), the control server 20 judges whether or not the detected external storage has already complete discovery (S168). In cases where the external storage is an external storage for which discovery has already been completed (S168: YES), the control server 20 displays a warning message on the terminal screen of the control terminal 30 (S169). For example, this warning message may include a content such as "The reserve information control table will be updated on the basis of the last performed discovery. Is this OK?". After displaying this warning message, the control server 20 updates the reserve information control table Tr on the basis of the last discovery performed in the past (S166), and notifies the control terminal 30 of the completion of processing (S167).

On the other hand, in cases where the detected external storage has still not been discovered (S168: NO), the control server 20 displays another warning message of the terminal screen of the control terminal 30 (S170), and ends the processing. For example, this warning message may include a content such as "Since discovery has not been performed, the reserve information control table cannot be updated (produced)." or the like.

In the present embodiment, as was described in detail above, a logical volume 240 can be handled as though this logical volume were a logical volume inside the first storage device 100 by mapping an external disk drive 220 into a V-VOL. Accordingly, the memory resources of the second storage device 200 can be unified with the first storage device 100 and utilized effectively.

In the present embodiment, the possibility of performing requested construction altering operations for the respective storage devices 100 and 200 can be judged, and the system can be devised so that only operations that have no effect on the cooperation between storages are performed, thus maintaining the cooperative relationship between virtual volume 163V and real volumes 240. Accordingly, the destruction of inter-storage cooperation by an erroneous operation performed by the user can be prevented in advance, so that the safety of operation can be enhanced, and the convenience of the system can be improved.

In the present embodiment, not only operations that destroy inter-storage cooperation in logical terms, but also operations that generate mismatching in the storage contents of virtual volume 163V and real volumes 240, can be prohibited; accordingly, inter-storage cooperation can be maintained so that correct operation is possible.

In the present embodiment, the performance of operations that violate specified prohibition conditions is prohibited in order to maintain cooperation only in cases where storages are cooperating; in cases where storages are not cooperating, prohibition processing is not performed. In other words, in cases where virtual volumes 163V and real volumes 240 are connected, specified operations on these volumes are prohibited; however, in the case of volumes that are unrelated to external connections, such operations are allowed. Accordingly, the reliability of operation can be increased while maintaining the convenience of the system.

In the present embodiment, a construction that causes the contents of operations performed on the storage system to be reflected in a reserve information control table Tr can be used. Accordingly, the most recent construction state of the storage system can be controlled by the reserve information control table Tr without the bother of acquiring construction information Tc1 and Tc2 from the respective storage devices 100 and 200 each time.

In the present embodiment, the reserve information control table Tr is updated when instructions are given for the execution of discovery processing. Furthermore, in the present embodiment, the reserve information control table Tr is updated when discovery processing is executed, only in cases where the user explicitly indicates updating of the reserve information control table Tr. Accordingly, updating of the reserve information control table Tr can be performed in accordance with the wishes of the user, so that the convenience of the system is improved. In contrast to this, in cases where the reserve information control table Tr is automatically updated without confirming the intentions of the user, considerable time may be required for this updating processing, and there is a possibility that waiting time that is not desired by the user will be increased. However, a construction in which the reserve information control table Tr is automatically updated is also included in the present invention.

2. Second Embodiment

Figure 23:
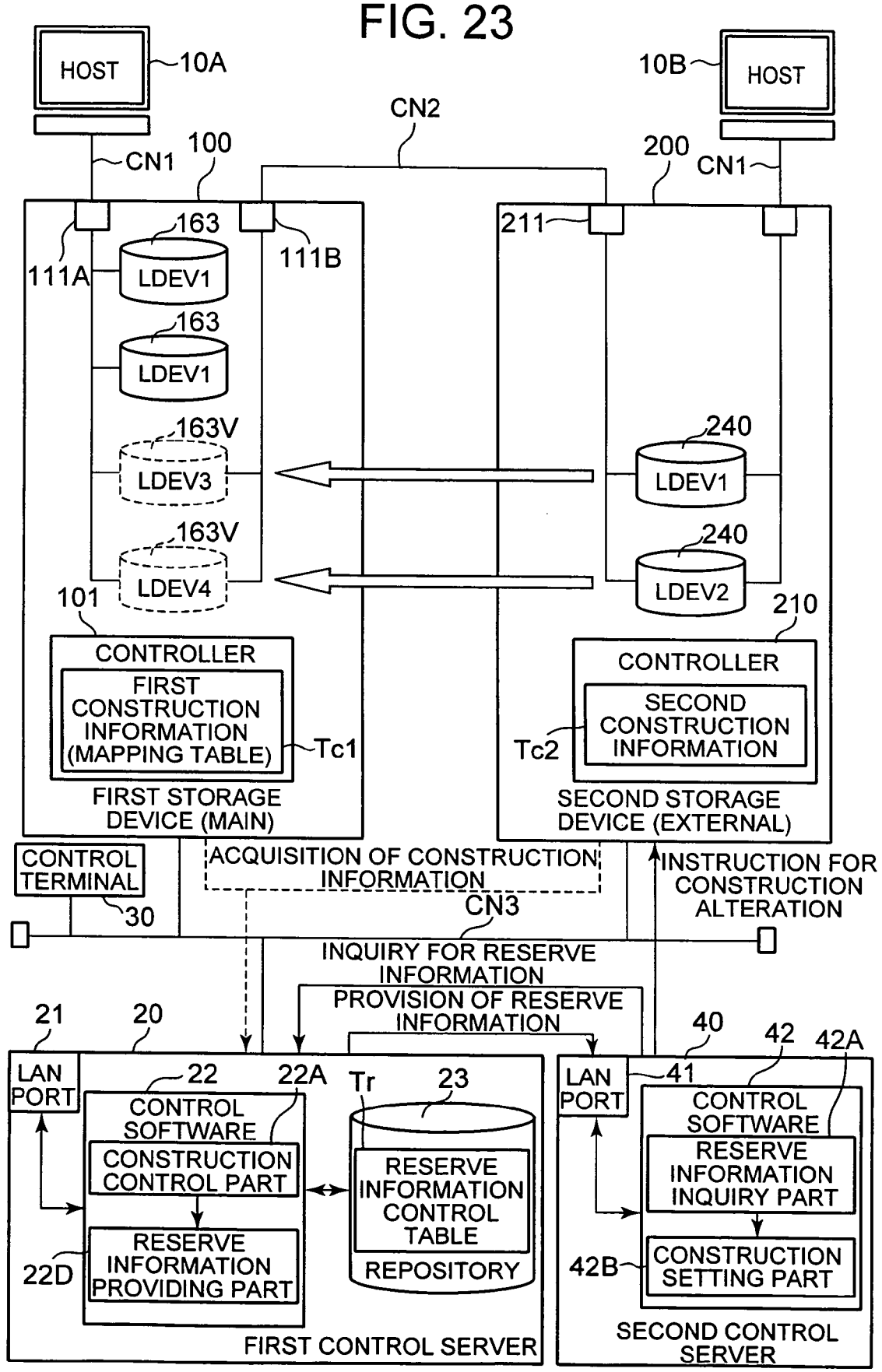
FIG. 23 is an explanatory diagram which shows the overall construction of a storage system constituting a second embodiment in model form.

A second embodiment of the present invention will be described with reference to FIGS. 23 and 24. The following embodiments including the present embodiment correspond to modifications of the first embodiment. In the present embodiment, dedicated control servers 20 and 40 are respectively disposed in the respective storage devices 100 and 200, and these respective control servers 20 and 40 are caused to cooperate.

The first control server 20 controls the construction of the first storage device 100, which is the main storage. The control software 22 of the first control server 20 comprises a construction control part 22A and a reserve information providing part 22D. Furthermore, the control software 22 also comprises the construction setting part 22C shown in FIG. 3; however, this is omitted because of space considerations. Furthermore, the first control server 20 controls a reserve information control table Tr inside the repository 23.

The construction control part 22A acquires respective construction information Tc1 and Tc2 from the respective storage devices 100 and 200, and updates the reserve information control table Tr. The reserve information providing part 22D provides information registered in the reserve information control table Tr to the second control server 40 in response to inquiries from the second control server 40. Furthermore, there are a number of conceivable methods for providing this reserve information. One method is a method that provides the requested reserve information "as is". Another method is a method that judges the possibility of performance on the basis of the request reserve information, and then provides the judgment results. Either of these methods may be used.

The second control server 40 controls the construction of the second storage device 200, which is an external storage. The control software of the second control server 40 comprises a reserve information inquiry part 42A and a construction setting part 42B. The reserve information inquiry part 42A sends inquiries to the first control server 20 regarding reserve information corresponding to construction altering operations requested by the user. The construction setting part 42B performs only operations that have no effect on inter-storage cooperation (among the construction altering operations requested by the user).

Figure 24:
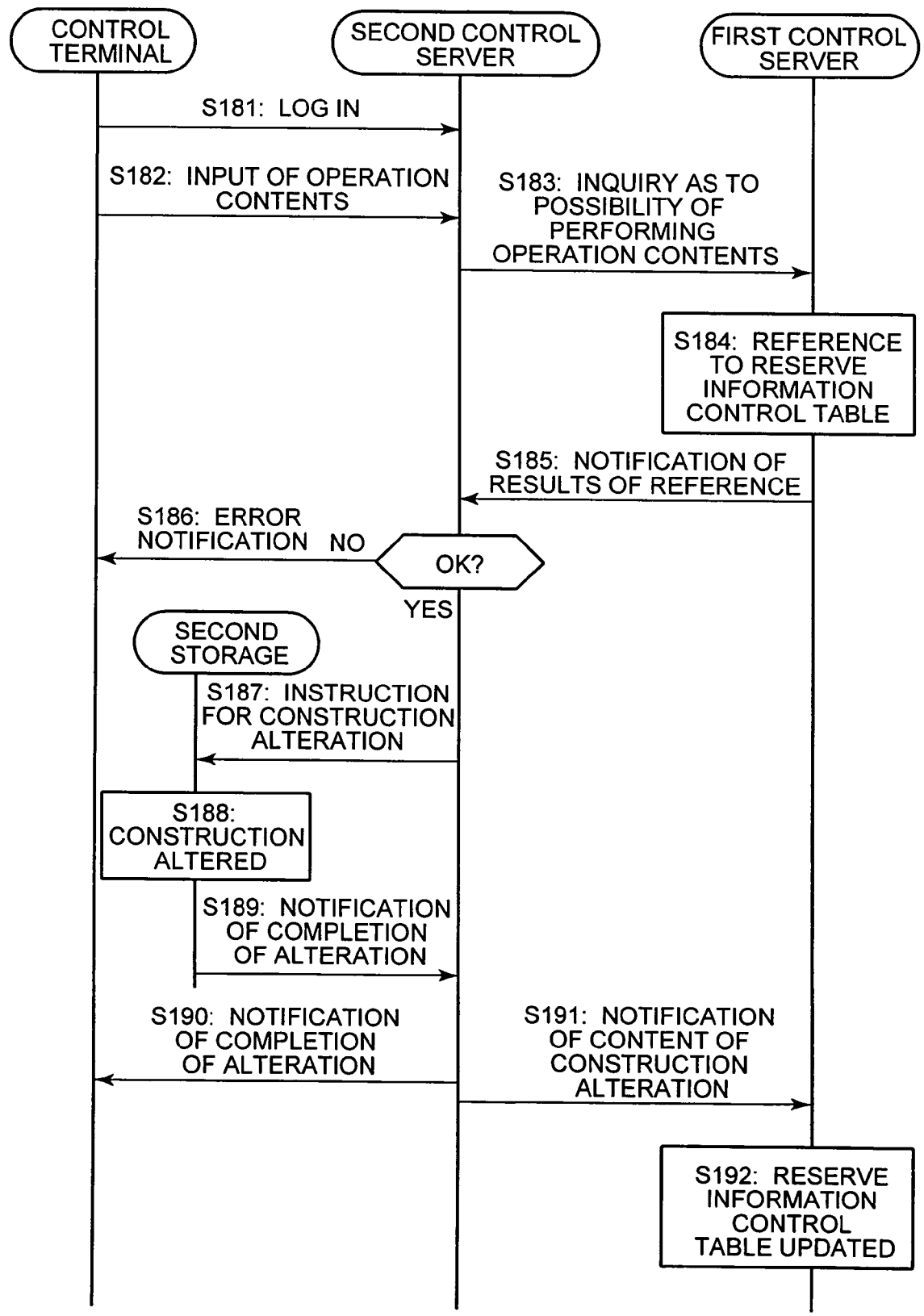
FIG. 24 is a sequence flow chart showing the cooperative processing between respective control servers.

FIG. 24 is a sequence flow chart showing an outline of the operation between the respective control servers 20 and 40. The user who desires a construction alteration of the second storage device 200 logs into the second control server 40 via the control terminal 30 (S181), and inputs the operation content (S182).

The second control server 40 sends an inquiry to the first control server 20 regarding the possibility of performing construction altering operation requested by the user (S183). The first control server 20 that receives this inquiry refers to the reserve information control table Tr (S184), and notifies the second control server 40 of the results (S185). As was described above, the possibility of performing the operation may be judged within the first control server 20; alternatively, only reserve information relating to the construction alteration may be transmitted from the first control server 20 to the second control server 40, and the possibility of performing the operation may be performed within the second control server 40.

The second control server 40 judges whether or not the operation requested by the user may be performed, and in cases where the performance of this operation is prohibited, the second control server 40 notifies the control terminal 30 of an error (S186). On the other hand, in cases where the operation requested by the user can be performed, the second control server 40 issues an instruction for a construction alteration to the second storage device 200 (S187).

The controller 210 of the second storage device 200 that receives this instruction alters the construction inside the storage device 200 (S188), and notifies the second control server 40 of the completion of this alteration (S189).

When the second control server 40 confirms the construction alteration of the second storage device 200, the second control server 40 notifies the control terminal 30 that the construction alteration has been completed (S190). Furthermore, the second control server 40 notifies the first control server 20 of the content of the performed construction alteration (S191). The first control server 20 that receives this notification from the second control server 40 updates the reserve information control table Tr (S192). Furthermore, for example, if the content of the construction altering operation is stored in the first control server 20 at the time of the inquiry performed in S183, then notification that the performance of the operation has been completed is sufficient in S191.

Thus, in the present embodiment, by causing the cooperation of a plurality of control servers 20 and 40 that respectively control a plurality of storage devices 100 and 200, it is possible to perform a correct operation while maintaining cooperation between the storage devices.

3. Third Embodiment

Figure 25:
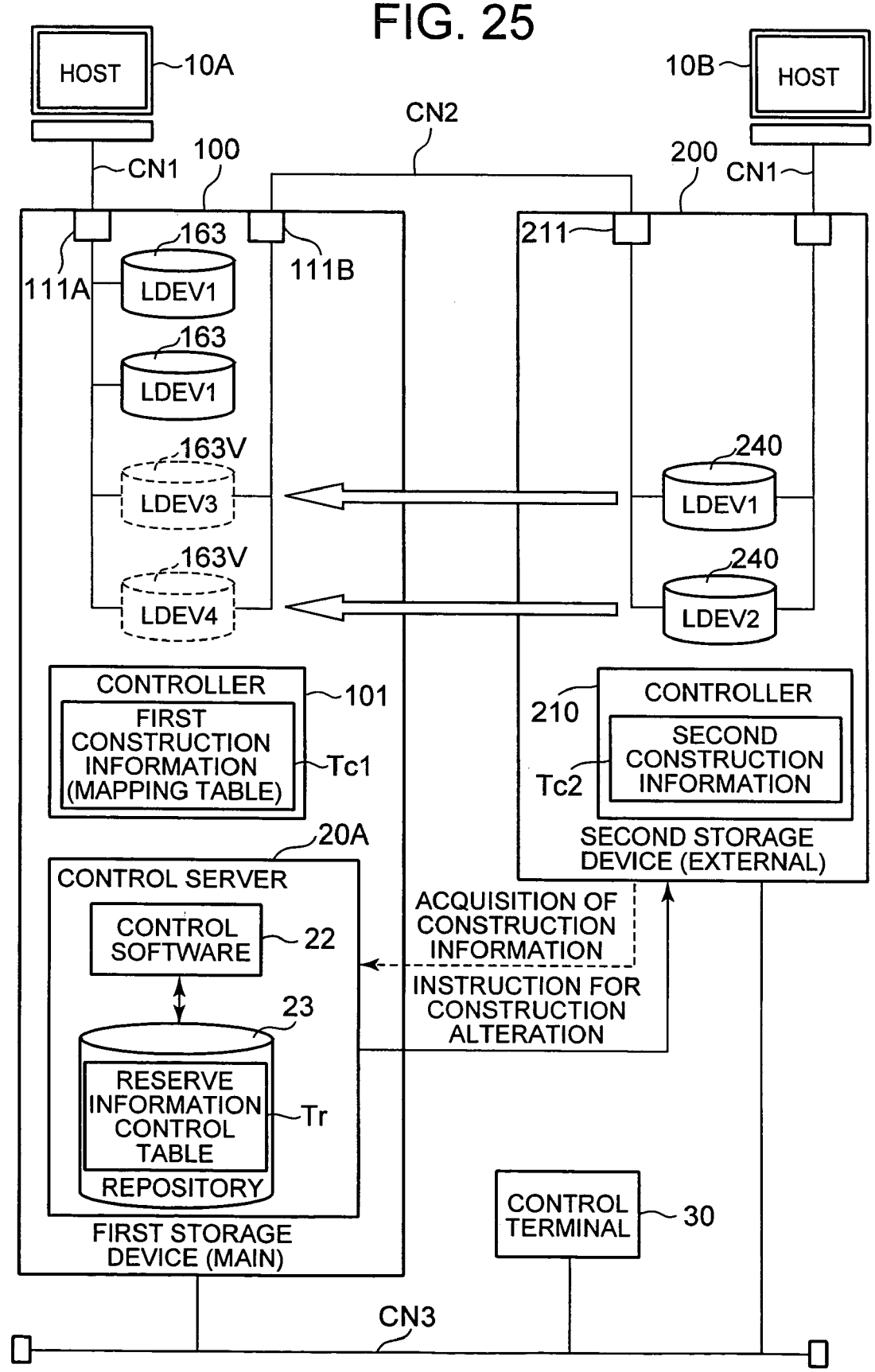
FIG. 25 is an explanatory diagram which shows the overall construction of a storage system constituting a third embodiment in model form.

Next, FIG. 25 is an explanatory diagram which shows in model form the overall construction of a storage system constituting a third embodiment of the present invention. In the present embodiment, a control server 20A is disposed inside the first storage device 100 by utilizing the computer resources (CPU, memory and the like) of the first storage device 100.

Furthermore, the present invention is not limited to the respective embodiments described above. Various additions, alterations and the like can be effected by a person skilled in the art within the scope of the present invention. For example, operations that assign a real volume used for an external connection to another port other than the port used for the external connection are prohibited. However, the present invention is not limited to this; for example, even in cases where the volume is assigned to another port, no mismatching is generated in the storage contents if the access via this port is set as read only; accordingly, such operations can also be permitted.

What is claimed is:

1. A storage system comprising:
a first storage device which can set virtual volumes, and which has a plurality of ports;
a first host coupled to the first storage device;
a second storage device which is communicably connected to this first storage device, and which can set real volumes and has a plurality of ports;
a second host coupled to the second storage device; and
a managing device which can respectively control alterations in the constructions of said first storage device and said second storage device;
wherein the second storage device is useable by the first host and the second host;
wherein, responsive to an alteration request to alter a construction of the first storage device and/or the second storage device, said managing device consults stored construction information defining real-time constructions of both the first storage device and the second storages device, to determine whether an alteration instructed by the alteration request would destroy an existing mutual dependence relationship between a volume and another volume, port or program of the storage system, and said managing device prohibits the alteration when it is determined that the alteration would destroy the existing mutual dependence relationship;
wherein said managing device executes (1) volume mapping processing which is used to associate said real volumes set in said second storage control device with said virtual volumes set in said first storage control device, and thus connect said real volumes as data storage destinations for said virtual volumes, and (2) prohibition processing which is used to prohibit construction altering operations that have an effect on inter-volume connection constructions between said virtual volumes and said real volumes that are produced by said volume mapping processing; and
wherein said prohibition processing prohibits construction altering operations that have an effect on said inter-volume connection constructions only in cases where said inter-volume connection constructions are maintained, and stops said prohibition in cases where said inter-volume connection constructions are cancelled.

2. The storage system according to claim 1, wherein said volume mapping processing is processing in which said virtual volumes and said real volumes are associated by associating real volumes of said second storage device with an intermediate storage stratum disposed between a logical storage stratum and a physical storage stratum inside said first storage device.

3. The storage system according to claim 1, wherein the construction altering operations that have an effect on said inter-volume connection constructions are operations that destroy said inter-volume connection constructions.

4. The storage system according to claim 3, wherein at least one type of operation selected from canceling operations that cancel said inter-volume connection constructions and unifying operations that unify said real volumes associated with said virtual volumes with other real volumes inside said second storage device, is included in the operations that destroy said inter-volume connection constructions.

5. The storage system according to claim 1, wherein said construction altering operations that have an effect on said inter-volume connection constructions are operations that can generate mismatching in the storage contents of said real volumes.

6. The storage system according to claim 5, wherein at least one type of operation selected from operations that assign said real volumes to communications ports other than the communications port used for said inter-volume connection constructions, and operations that set copying pairs for said real volumes, is included in said operations that can generate mismatching in the storage contents of said real volumes.

7. The storage system according to claim 1, wherein said managing device comprises a construction control part which acquires information relating to the respective constructions of the first storage device and second storage device from the first storage device and second storage device, and which stores and controls the acquired information in the construction information storage part, a judgment part which judges whether or not said requested construction altering operation is an operation that has an effect on said inter-volume connection constructions on the basis of the requested construction altering operation and the information controlled by the construction control part, and a construction setting part which performs said requested construction altering operation in cases where the judgment results obtained by the judgment part are affirmative.

8. The storage system according to claim 7, wherein in cases where said construction altering operation is performed by said construction setting part, said construction control part causes the contents of this performed construction altering operation to be reflected in the information that is stored in said construction information storage part.

9. The storage system according to claim 7, wherein said construction control part acquires information relating to the respective constructions of said first storage device and said second storage device from said first storage device and said second storage device in cases where instructions are given for the execution of discovery processing.

10. The storage system according to claim 7, wherein said construction control part acquires information relating to the respective constructions of said first storage device and said second storage device from said first storage device and said second storage device in cases where instructions are given for the execution of discovery processing, and there is a request for indication.

11. The storage system according to claim 1, wherein said managing device is constructed separately from said first storage device and said second storage device, and is communicably connected to said first storage device and said second storage device, respectively.

12. The storage system according to claim 1, wherein said managing device is disposed inside said first storage device.

13. The storage system according to claim 1, wherein said managing device includes a first managing device which alters the construction of said first storage device, and a second managing device which is communicably connected to this first managing device, and which alters the construction of said second storage device, said first managing device acquires and controls information relating to the respective constructions of said first storage device and said second storage device from said first storage device and said second storage device, and in cases where a construction altering operation of said second storage device is requested, said second managing device inquires for said information controlled by said first managing device, and in cases where said requested construction altering operation is not an operation that has an effect on said inter-volume connection constructions, said second managing device performs said request construction altering operation.

14. The storage system according to claim 1:
wherein construction altering instructions are allowed in the first storage device which can set virtual volumes, as not having an effect on an inter-volume connection construction; and
wherein construction altering instructions are prohibited in the second storage device which can set real volumes, as having an effect on the inter-volume connection construction.

15. A storage system construction control method which is used to control the construction of a storage system in which a first storage device and a second storage device are communicably connected, wherein the first storage device is coupled to a first host and can set virtual volumes and has a plurality of ports, and wherein the second storage device is coupled to a second host and can set real volumes and has a plurality of ports, the method comprising:
a connection step in which a virtual volume disposed inside said first storage device and a real volume disposed inside said second storage device are associated so that said real volume is connected as the data storage destination of said virtual volume;
a reception step in which a construction altering instruction instructing an alteration for said first storage device and/or said second storage device is received;
a judgment step which, responsive to the alteration request, consults stored construction information defining real-time constructions of both the first storage device and the second storages device, to determine whether an alteration instructed by the alteration request would destroy an existing mutual dependence relationship between a volume and another volume, port or program of the storage system, and prohibits the alteration when it is determined that the alteration would destroy the existing mutual dependence relationship;
executing (1) volume mapping processing which is used to associate said real volumes set in said second storage control device with said virtual volumes set in said first storage control device, and thus connect said real volumes as data storage destinations for said virtual volumes, and (2) prohibition processing which is used to prohibit construction altering operations that have an effect on inter-volume connection constructions between said virtual volumes and said real volumes that are produced by said volume mapping processing; and
wherein said prohibition processing prohibits construction altering operations that have an effect on said inter-volume connection constructions only in cases where said inter-volume connection constructions are maintained, and stops said prohibition in cases where said inter-volume connection constructions are cancelled.

16. The storage system construction control method according to claim 15, which further comprises a construction information control step in which information relating to the respective constructions of said first storage device and said second storage device is acquired from said first storage device and said second storage device, and is stored in said construction information storage part, wherein in said judgment step, it is judged on the basis of the information stored in said construction information storage part, whether or not said construction altering instruction is an instruction that has an effect on an inter-volume connection construction.

17. The storage system construction control method according to claim 16, which further comprises a discovery step in which discovery is performed for said first storage device, wherein in said construction information control step, information relating to the respective constructions of said first storage device and said second storage device is acquired from said first storage device and said second storage device and stored in said construction information storage part when said discovery is performed by said discovery step.

18. The storage system construction control method according to claim 16, wherein in said construction information control step, the information stored in said construction information storage part is updated on the basis of the contents of the performed construction altering operation in cases where said construction altering operation is performed by said execution step.

19. The storage system construction control method according to claim 16, wherein construction altering instructions are indicated allowed in the first storage device which can set virtual volumes, as not having an effect on the inter-volume connection construction, and
wherein construction altering instructions are indicated prohibited in the second storage device which can set real volumes, as having an effect on an inter-volume connection construction.

* * * * *